(12) United States Patent
Xiu et al.

(10) Patent No.: US 10,484,686 B2
(45) Date of Patent: Nov. 19, 2019

(54) PALETTE CODING MODES AND PALETTE FLIPPING

(71) Applicant: Vid Scale, Inc., Wilmington, DE (US)

(72) Inventors: Xiaoyu Xiu, San Diego, CA (US); Yan Ye, San Diego, CA (US); Yuwen He, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 119 days.

(21) Appl. No.: 15/547,121

(22) PCT Filed: Jan. 28, 2016

(86) PCT No.: PCT/US2016/015443
§ 371 (c)(1),
(2) Date: Jul. 28, 2017

(87) PCT Pub. No.: WO2016/123388
PCT Pub. Date: Aug. 4, 2016

(65) Prior Publication Data
US 2017/0374366 A1 Dec. 28, 2017

Related U.S. Application Data

(60) Provisional application No. 62/109,587, filed on Jan. 29, 2015, provisional application No. 62/114,051, filed on Feb. 9, 2015.

(51) Int. Cl.
*H04N 19/129* (2014.01)
*H04N 19/176* (2014.01)
(Continued)

(52) U.S. Cl.
CPC ......... *H04N 19/129* (2014.11); *H04N 19/147* (2014.11); *H04N 19/176* (2014.11); *H04N 19/182* (2014.11); *H04N 19/70* (2014.11)

(58) Field of Classification Search
CPC .. H04N 19/129; H04N 19/147; H04N 19/176; H04N 19/182; H04N 19/70
(Continued)

(56) References Cited

U.S. PATENT DOCUMENTS

2008/0144952 A1* 6/2008 Chen .................. H04N 19/12
382/239
2009/0010533 A1 1/2009 Hung
(Continued)

FOREIGN PATENT DOCUMENTS

| CN | 101340587 A | 1/2009 |
|---|---|---|
| CN | 104021579 A | 9/2014 |
| WO | WO 2015/006724 A2 | 1/2015 |

OTHER PUBLICATIONS

Guo et al., "Color Palette for Screen Content Coding" 2014, IEEE International Conference on Image Processing, pp. 1-3 (Year: 2014).*

(Continued)

*Primary Examiner* — Frederick D Bailey
*Assistant Examiner* — Matthew David Kim
(74) *Attorney, Agent, or Firm* — Condo Roccia Koptiw LLP

(57) ABSTRACT

An palette index map of a video coding unit may be flipped during palette coding if a large run of similar pixels are present at the beginning of the coding unit and a small run of similar pixels are present at the end of the coding unit. The flipping may enable efficient signaling and coding of the large run of pixels. An indication may be sent signaling the flipping. During decoding, an inverse flip may be performed to restore the pixels of the flipped coding unit to their original positions. Selection of a prediction mode for palette coding may take into account various combinations of an index mode run followed by a copy-above mode run. A (Continued)

prediction mode with the smallest per-pixel average bit cost may be selected. Palette sharing may be enabled.

19 Claims, 16 Drawing Sheets

(51) Int. Cl.
  *H04N 19/70* (2014.01)
  *H04N 19/147* (2014.01)
  *H04N 19/182* (2014.01)
(58) Field of Classification Search
  USPC .......................................................... 375/240
  See application file for complete search history.

(56) References Cited

U.S. PATENT DOCUMENTS

| | | | |
|---|---|---|---|
| 2010/0046628 A1* | 2/2010 | Bhaskaran | H04N 19/103 375/240.24 |
| 2010/0272325 A1* | 10/2010 | Veldhuis | G06K 9/38 382/115 |
| 2011/0001764 A1 | 1/2011 | Rhodes | |
| 2014/0301474 A1* | 10/2014 | Guo | H04N 19/50 375/240.24 |
| 2015/0010053 A1 | 1/2015 | Xu et al. | |
| 2015/0016501 A1* | 1/2015 | Guo | G06T 9/00 375/240.02 |
| 2016/0316214 A1* | 10/2016 | Gisquet | G09G 5/06 |
| 2016/0323584 A1* | 11/2016 | Chuang | H04N 19/56 |
| 2016/0323594 A1* | 11/2016 | Sun | H04N 19/176 |
| 2017/0264904 A1* | 9/2017 | Koval | H04N 19/176 |

OTHER PUBLICATIONS

Bossen et al., "HM Software Manual", AHG chairs, Document: JCTVC-Software Manual, Joint Collaborative Team on Video Coding (JCT-VC) of ITU-T SG16 WP3 and ISO/IEC JTC1/SC29/WG11, Sep. 19, 2014, pp. 1-28.
Bross et al., "High Efficiency Video Coding (HEVC) Text Specification Draft 10", Document No.-JCTVC-L1003, 12th Meeting: Geneva, CH, Jan. 14-23, 2013, 321 pages.
Itu/Iso/Iec, "Joint Call for Proposals for Coding of Screen Content", ITU-T Q6/16 Visual Coding and ISO/IEC JTC1/SC29/WG11 Coding of Moving Pictures and Audio, Document No.-ISO/IEC JTC1/SC29/WG11 MPEG2014/N14175, San Jose, USA, Jan. 2014, 16 pages.
Joshi et al., "High Efficiency Video Coding (HEVC) Screen Content Coding: Draft 1", Document No.-JCTVC-R1005-v2, 18th Meeting; Sapporo, Japan, Jun. 30-Jul. 9, 2014, 360 pages.
Joshi et al.,"High Efficiency Video Coding (HEVC) Screen Content Coding: Draft 2", Document No.-JCTVC-S1005, Strasbourg, France, Oct. 2014, 374 pages.
Onno et al., "Suggested Combined Software and Text for Run-Based Palette Mode", Document No.-JCTVC-R0348, Joint Collaborative Team on Video Coding (JCT-VC) of ITU-T SG 16 WP 3 and ISO/IEC JTC 1/SC 29/WG 11, 18th Meeting:Sapporo, Japan, Jun. 30-Jul. 9, 2014, pp. 1-10.
Pang et al., "Non-RCE3: Intra Motion Compensation with 2-D MVs", Qualcomm Incorporated, Document No.-JCTVC-N0256, Jul. 25-Aug. 2, 2013, pp. 1-12.
Pu et al., "Suggested Software for the AHG on Investigation of Palette Mode Coding Tools", Document No.-JCTVC-P0303, Joint Collaborative Team on Video Coding (JCT-VC) of ITU-T SG 16 WP 3 and ISO/IEC JTC 1/SC 29/WG 11, 16th Meeting: San José, US, Jan. 9-17, 2014, pp. 1-5.
Pu et al.,"Non-CE6: Improvement on Palette Run Coding", Qualcomm Incorporated, Document: JCTVC-S0111, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-3.
Sansli et al.,"SCCE3:Test B.15-Scanning Indicator for the Palette Coded CUs", Joint Collaborative Team on Video Coding (JCT-VC) of ITU-T SG 16 WP 3 and ISO/IEC JTC 1/SC 29/WG 11, Nokia, Document No.-JCTVC-R0048, 18th Meeting: Sapporo, Japan, Jun. 30-Jul. 9, 2014, 3 pages.
Sole et al., "AhG8: Requirements for Wireless Display Applications", Qualcomm, Document No.-JCTVC-M0315, 13th Meeting: Incheon, KR, Apr. 18-26, 2013, 2 pages.
Sullivan et al., "Rate-Distortion Optimization for Video Compression", Signal Processing Magazine, IEEE, vol. 15, No. 6, Nov. 1998, pp. 74-90.
Vermeir, Thijs, "Use Cases and Requirements for Lossless and Screen Content Coding", Barco, Document No.-JCTVC-M0172, Apr. 18-26, 2013, 6 pages.
Weerakkody et al., "Mirroring of Coefficients for Transform Skipping", Joint Collaborative Team on Video Coding (JCT-VC) of ITU-T SG 16 WP 3 and ISO/IEC JTC 1/SC 29/WG 11, BBC Research & Development, Document No.-JCTVC-K0294, 11th Meeting: Shanghai, China, Oct. 10-19, 2012, 3 pages.
Xiu et al., "Non-CE1: Improved Palette Run-Length Coding With Palette Flipping", Joint Collaborative Team on Video Coding (JCT-VC) of ITU-T SG 16 WP 3 and ISO/IEC JTC 1/SC 29/WG 11, InterDigital Communications, LLC, Qualcomm Incorporated, Document No.-JCTVC-T0 119 r1, 20th Meeting: Geneva, CH, Feb. 10-18, 2015, 9 pages.
Zhang et al., "SCCES Test 3.2.1: In-Loop Color-Space Transform", Qualcomm Inc., InterDigital Communications, LLC, Document No.-JCTVC-R0147, 18th Meeting; Sapporo, Japan, Jun. 30-Jul. 9, 2014, 8 pages.
Laroche et. al., "SCCE3 Test B.7: Palette Run Coding", Canon, JCTVC-R0085, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-9.

* cited by examiner

FIG. 5B

PALETTE CODING MODES AND PALETTE FLIPPING

CROSS-REFERENCE TO RELATED APPLICATIONS

This application is the National Stage Entry under 35 U.S.C. § 371 of Patent Cooperation Treaty Application No. PCT/US2016/015443, filed Jan. 28, 2016, which claims the benefit of Provisional U.S. Patent Application No. 62/109,587, filed Jan. 29, 2015, and Provisional U.S. Patent Application No. 62/114,051, filed Feb. 9, 2015, the disclosures of which are incorporated herein by reference in their entireties.

BACKGROUND

Video content sharing applications may be used to provide various utilities and/or services including, for example, remote desktop simulation, video conferencing, mobile media presentation, and/or the like. Certain types of video content may have unique characteristics. For example, screen content may comprise numerous blocks with several colors (e.g., major colors) and/or sharp edges (e.g., since there may be sharp curves and text inside the screen content). Existing video coding techniques may not fully consider these characteristics. Low performance may result. For example, reconstructed pictures may have quality issues (e.g., the curves and texts may be blurred and/or difficult to recognize). Accordingly, methods and apparatus may be desired to encode and/or decode screen content and/or other types of video content.

SUMMARY

A video coding device may code a video signal using a color palette. The video coding device may include a processor configured to generate palette indices associated with the color palette for a coding unit of the video signal. The processor may be further configured to determine whether to flip a palette index map of the coding unit. The processor may decide to flip the coding unit (or the palette index map associated with the coding unit) if the flipping may move a large run of consecutive pixels (e.g., consecutive pixels with a same palette index value) from the beginning of the coding unit to the end of the coding unit. Based on a decision to flip the coding unit (or the palette index map associated with the coding unit), the processor may be configured to flip the coding unit (or the palette index map associated with the coding unit) at least once. The flipping may be performed in a direction orthogonal to a scan order of the coding unit. The flipping may be performed in two directions orthogonal to each other. Further, the processor may be configured to provide palette coding information in a video bitstream. The palette coding information may include palette table information, palette index map information, an indication of whether the coding unit (or the palette index map associated with the coding unit) has been flipped, and/or an indication of the scan order.

A video coding device may receive a video bitstream that comprises palette coding information. The palette coding information may include palette table and palette index map information and/or an indication of whether a coding unit (or a palette index map associated with the coding unit) has been flipped during encoding. The palette table and palette index map information may be used to reconstruct the coding unit. The indication may be used to determine whether an inverse flipping of the coding unit (or the palette index map associated with the coding unit) should be performed. If the determination is to perform an inverse flipping, the inverse flipping may be performed once in a direction that may be determined based on a scan order of the coding unit. An indication of the scan order may be comprised in the video bitstream. The inverse flipping may also be performed twice, e.g., in a first and second directions that are orthogonal to each other.

A video coding device may select a palette coding mode for a pixel. The selection may take into account various combinations of an index mode run followed by a copy-above mode run, starting at the pixel. The potential combinations may be derived based on a run-length of the index mode at the pixel and a run-length of the copy-above mode at a scan position following the index mode run. Costs associated with coding the potential combinations may be compared to determine a minimum combination mode cost. The minimum combination mode cost may be further compared with the cost associated with coding a plurality of pixels starting at the pixel only in the index mode and with the cost associated with coding a plurality of pixels starting at the pixel only in the copy-above mode. The costs may be calculated based on a per-pixel average number of bits associated with the coding modes. The palette mode having the smallest cost may be selected.

A video coding apparatus or device described herein may be a video encoder and/or a video decoder.

BRIEF DESCRIPTION OF THE DRAWINGS

A more detailed understanding may be had from the following description, given by way of example in conjunction with the accompanying drawings wherein:

FIG. 5B illustrates an example vertical scan of a palette index map associated with a coding unit.

DETAILED DESCRIPTION OF ILLUSTRATIVE EMBODIMENTS

A detailed description of illustrative embodiments will now be described with reference to the various Figures. Although this description provides examples of possible implementations, it should be noted that the examples are not intended to limit the scope of the application. Further, a video coding device as described herein may be a video encoder and/or a video decoder.

Video coding may be used to compress a video signal (e.g., screen content with high definition or ultra-high definition resolution). Compression may reduce the space and/or bandwidth required for storing and/or transmitting the video signal. There are various types of video coding techniques, such as block-based (including block-based hybrid), wavelet-based, and/or object-based techniques. There are different coding standards including, for example, MPEG-1, MPEG-2, MPEG-4, H.264/MPEG-4 Advanced Video Coding (AVC), and/or High Efficiency Video Coding (HEVC). A coding standard may have certain design goals and/or characteristics. For example, to produce results of similar quality, the HEVC coding standard may save 50% bandwidth compared to the H.264 standard. The HEVC may employ block-based hybrid video coding techniques. The HEVC may use larger video blocks (e.g., 64×64 pixels). Quad-tree partition may be utilized in HEVC to signal block coding information. A picture or slice may be partitioned into coding tree blocks (CTBs) of similar sizes (e.g., 64×64 pixels). One or more CTBs (e.g., each CTB) may be partitioned into coding units (CUs) with quad-tree. One or more CUs (e.g., each CU) may be partitioned into prediction units (PUs) and/or transform units (TUs) with quad-tree. Depending on the precision of motion vectors (e.g., a quarter pixel), linear filters may be applied in HEVC to obtain pixel values at fractional positions. Interpolation filters in HEVC may use different taps for different components (e.g., seven or eight taps for luma and 4 taps for chroma). De-blocking filters may be content-based. For example, based on one or more factors (e.g., coding mode differences, motion differences, reference picture differences, and/or pixel value differences), different de-blocking filter operations may be applied at the TU and/or PU boundaries. For entropy coding, HEVC may utilize context-based, adaptive arithmetic binary coding (CABAC) for one or more block level syntax elements (e.g., except high level parameters). At least two types of bins may be used in CABAC coding: context-based coded regular bins, and/or by-pass coded bins without context.

Figure 1:
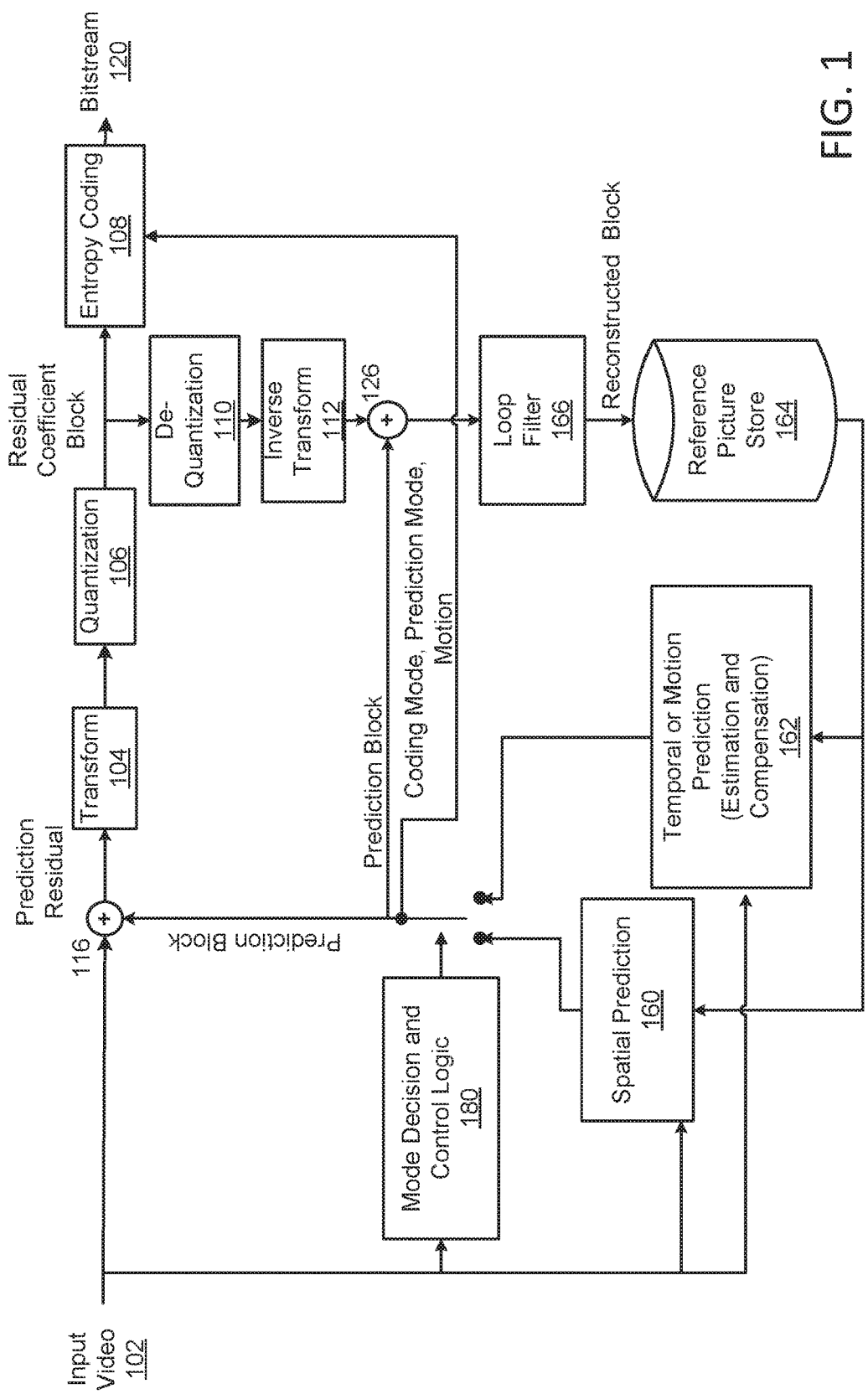
FIG. 1 shows a diagram of a first example single layer video coding system.

FIG. 1 shows a diagram of a block-based video coding system 100 (e.g., a video encoding system). The video coding system 100 may implement international video coding standards such as the MPEG-1, MPEG-2, MPEG-4, H.264/MPEG-4 Advanced Video Coding (AVC), and/or High Efficiency Video Coding (HEVC). The video coding system 100 may be a stand-alone system or part of another system or device (e.g., a computer, a video broadcast system, a cable system, a network-based video streaming service, a gaming application and/or service, and/or a multimedia communication system). The video coding system 100 may be implemented with hardware, software, or a combination of hardware and software. For example, the video coding system 100 may utilize one or more special purpose processors, general purpose processors, graphics processing units (GPUs), Application Specific Integrated Circuits (ASICs), Field Programmable Gate Array (FPGA) circuits, state machines, and the like. One or more components of the video coding system 100 may be implemented with software or firmware. The software or firmware may be incorporated in a computer-readable medium for execution by a computer or a processor. Examples of computer-readable media include electronic signals (transmitted over wired or wireless connections) and computer-readable storage media such as a read only memory (ROM), a random access memory (RAM), a register, cache memory, semiconductor memory devices, magnetic media (e.g., internal hard disks and removable disks), magneto-optical media, optical media (e.g., CD-ROM disks), and digital versatile disks (DVDs).

The video coding system 100 may process an input video signal 102 (e.g., screen content) block by block. The input video signal 102 may have a standard resolution (e.g., 640×1080) or a high resolution (e.g., 1920×1080 and beyond). A video block may include a number of pixels (e.g., 8×8, 16×16, 32×32, or 64×64 pixels). A video block may be referred to as a macroblock (MB) or a coding unit (CU). A CU may be partitioned into prediction units (PUs). In certain coding standards (e.g., HEVC), a CU may have up to 64×64 pixels.

The video coding system 100 may perform prediction on a video block (e.g., a MB, CU or PU). For example, the video coding system 100 may perform spatial prediction 160 and/or temporal prediction 162 on the video block. Spatial prediction may be referred to as "intra prediction" and may use pixels from previously-coded neighboring blocks (referred to herein as "prediction blocks") of the same frame or neighboring frames to predict the current video block. Spatial prediction may reduce spatial redundancy in the video signal. Temporal prediction may be referred to as "inter prediction" or "motion compensated prediction." Temporal prediction may use prediction blocks from previously-coded video frames to predict the current video block. Temporal prediction may reduce temporal redundancy in the video signal. The amount and/or direction of motion between the current video block and its prediction blocks may be calculated using one or more motion vectors. The calculated motion information may be utilized (e.g., signaled) to improve the efficiency of prediction. Multiple reference pictures may be supported. A reference index may be assigned to a previously-coded video block. The reference index may be used to determine from which reference picture (e.g., of a reference picture store 164) a temporal prediction signal may originate.

The video coding system 100 may include a mode decision and control logic block 180. The mode decision and control logic block 180 may be configured to determine which prediction mode to apply. One or more factors may be taken into account in the determination. For example, the mode decision and control logic block 180 may choose the prediction mode based on rate-distortion optimization (RDO) criteria and/or bit rate requirements. For example, the mode decision and control logic block 180 may choose a prediction mode with the minimum sum of absolute transform differences (SATD) or a prediction mode with the smallest rate distortion cost.

Prediction may produce prediction residual at 116. The video coding system 100 may transform (e.g., via a transform unit 104) and quantize (e.g., via a quantization unit 106) the prediction residual into a set of uncorrelated coefficients (referred to herein as "transform coefficients"). A target bit-rate may be achieved. The transform coefficients may be de-quantized at 110 and/or inverse transformed at 112 to form reconstructed residual. The reconstructed residual may be added to the prediction block at 126 to obtain a reconstructed video block. An in-loop filter 166, such as a de-blocking filter and/or Adaptive Loop Filter, may be applied to the reconstructed video block before it is put into the reference picture store 164 and/or used to code other video blocks. The transform coefficients may be sent for entropy coding at 108. Additional information related to coding mode, prediction mode, residual differential pulse code modulation (RDPCM) mode, and/or other coding parameters, may also be entropy-coded at 108. The additional information, as well as the transform coefficients, may be compressed and packed into an output video bitstream 120.

Figure 2:
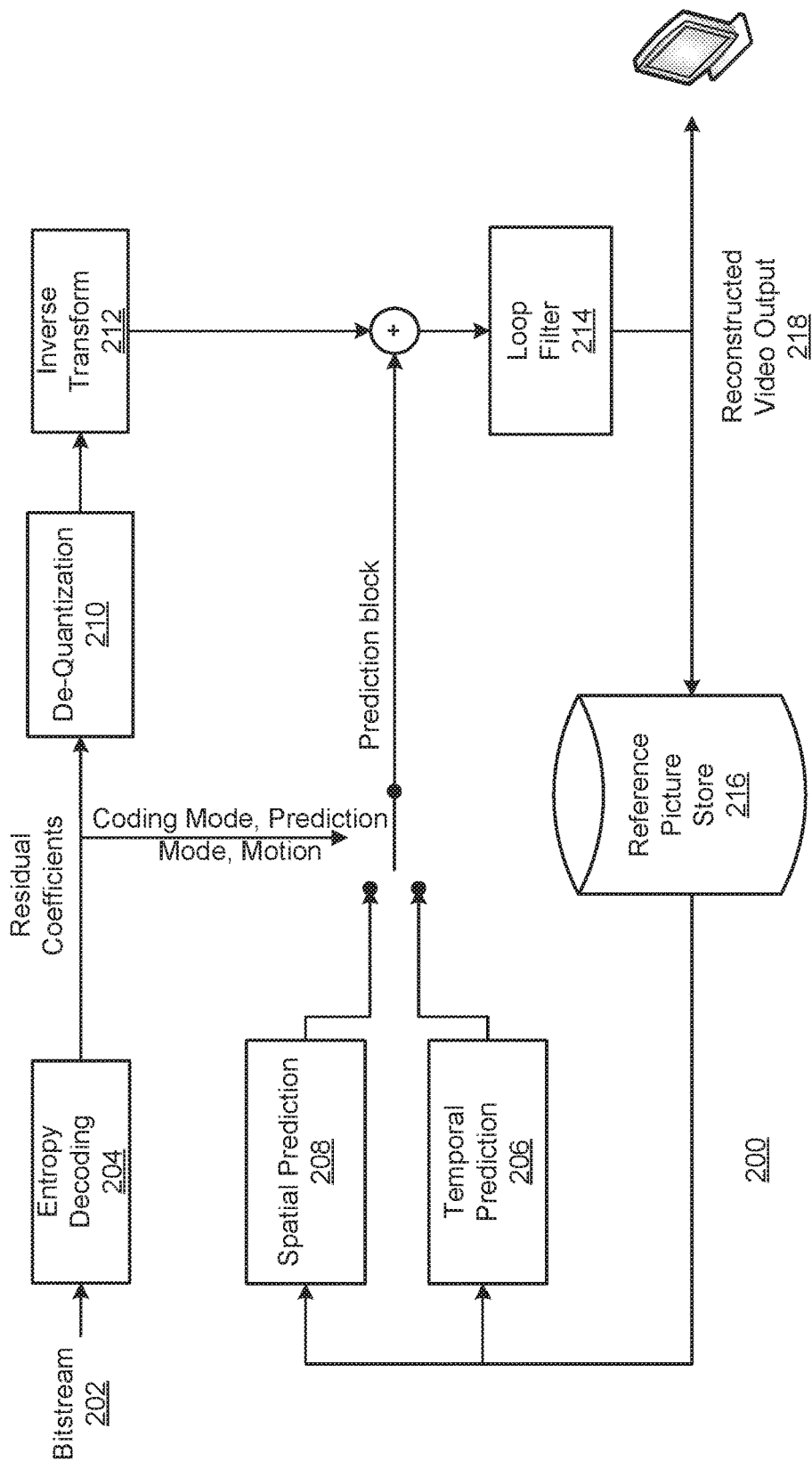
FIG. 2 shows a diagram of a second example single layer video coding system.

FIG. 2 shows a diagram of a video coding system 200 (e.g., a video decoding system). The video coding system 200 may receive a video bitstream 202 (e.g., the video bitstream 120 produced by the video coding system 100). The bitstream 202 may be received over a variety of transport media including, for example, a public network (e.g., the Internet), an internal network (e.g., a corporate intranet), a virtual private network ("VPN"), a cellular network, a cable network, a serial communication link, an RS-485 communication link, an RS-232 communication link, an internal data bus, and/or the like. The video code system 200 may utilize block-based decoding methods that conform to international video standards such as the MPEG-1, MPEG-2, MPEG-4, H.264/MPEG-4 Advanced Video Coding (AVC), and/or High Efficiency Video Coding (HEVC). The video code system 200 may be a stand-alone unit or part of another system or device, e.g., a computer, a mobile device, a television system, a gaming console and application, and/or a multimedia communication system. The video coding system 200 may be implemented with hardware, software, or a combination of hardware and software. For example, the video coding system 200 may utilize one or more special purpose processors, general purpose processors, graphics processing units (GPUs), Application Specific Integrated Circuits (ASICs), Field Programmable Gate Array (FPGA) circuits, state machines, and the like. One or more components of the video coding system 200 may be implemented with software or firmware. The software or firmware may be incorporated in a computer-readable medium for execution by a computer or a processor. Examples of computer-readable media include electronic signals (transmitted over wired or wireless connections) and computer-readable storage media such as a read only memory (ROM), a random access memory (RAM), a register, cache memory, semiconductor memory devices, magnetic media (e.g., internal hard disks and removable disks), magneto-optical media, optical media (e.g., CD-ROM disks), and digital versatile disks (DVDs).

The video coding system 200 may be configured to reconstruct a video signal based on the video bitstream 202. The reconstruction may include receiving a encoded block (or coding unit) of the video signal, obtaining the prediction blocks used to encode the video block, recovering the prediction residual of the video block, and/or reconstructing the video block (or coding unit) to its original form. The video coding system 200 may include components that perform functions inverse to the functions of the video coding system 100. For example, as shown in FIG. 2, the video coding system 200 may include an entropy decoding unit 204, a temporal prediction unit 206, a spatial prediction unit 208, a de-quantization unit 210, an inverse transform unit 212, a loop filter 214, and/or a reference picture store 216. The video coding system 200 may receive the video bitstream 202 at the entropy decoding unit 204. The entropy decoding unit 204 may unpack and entropy-decode the video bitstream 202, from which the entropy decoding unit 204 may extract the transform coefficients of a video block (e.g., such as those produced by the video coding system 100). Additional information related to coding mode, prediction mode, RDPCM mode, and/or other parameters used for encoding the video block, may also be extracted. Part of the extracted information may be sent to the spatial prediction unit 208 (e.g., if the video signal is intra-coded) and/or the temporal prediction unit 206 (e.g., if the video signal is inter-coded) to obtain prediction blocks. The transform coefficients may be de-quantized (e.g., at the de-quantization unit 210) and inverse transformed (e.g., at the inverse transform unit 212) to derive the prediction residual of the video block. The video coding system 200 may combine the prediction residual of the video block and the prediction blocks to obtain the original video block.

The video coding system 200 may apply in-loop filtering on the reconstructed video block, e.g., at the loop filter 214. Various in-loop filtering techniques may be used including, for example, de-blocking filtering and/or adaptive loop filtering. Upon reconstruction and filtering, the video coding system 200 may put the decoded/reconstructed video 218 into the reference picture store 216. Video blocks in the reference picture store 216 may be used to code other video blocks and/or to drive a display device.

Figure 3:
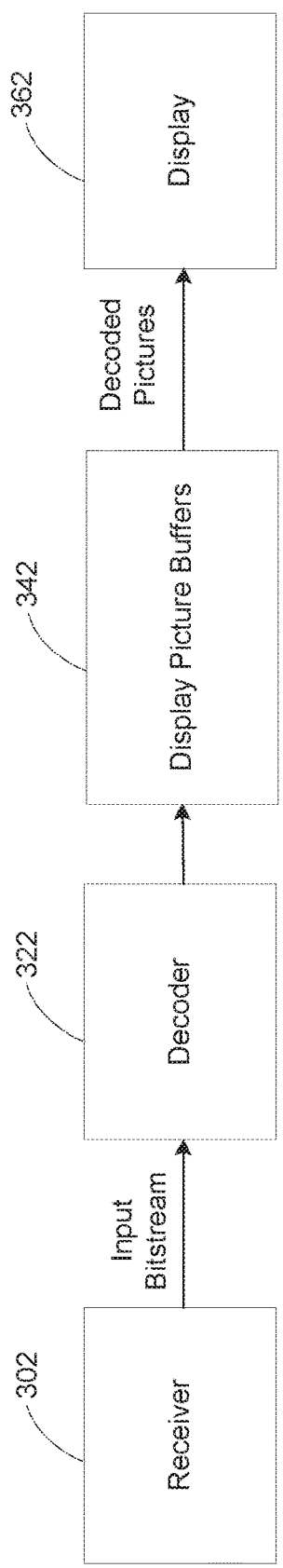
FIG. 3 illustrates an example screen content sharing system.

The design of a video coding system may take into account the characteristics of the video signal being coded. For example, while camera-captured nature content may include continuous-tone video signal, screen content may have discrete graphics comprising several major colors and/or sharp edges (e.g., due to sharp curves and text in the screen content). Screen content may also have spatial redundancy, which may be exploited during coding. FIG. 3 illustrates an example screen content sharing system 300. The system may include a receiver 302, a decoder 322, Display picture buffers 342, and/or a display (e.g., a renderer) 362. Intra block copy, palette coding, adaptive color transform, and/or other video coding techniques may be utilized to code the screen content. Palette coding may be part of a recursive quad-tree video coding framework. The HEVC standard may have such a framework.

Figure 4A:
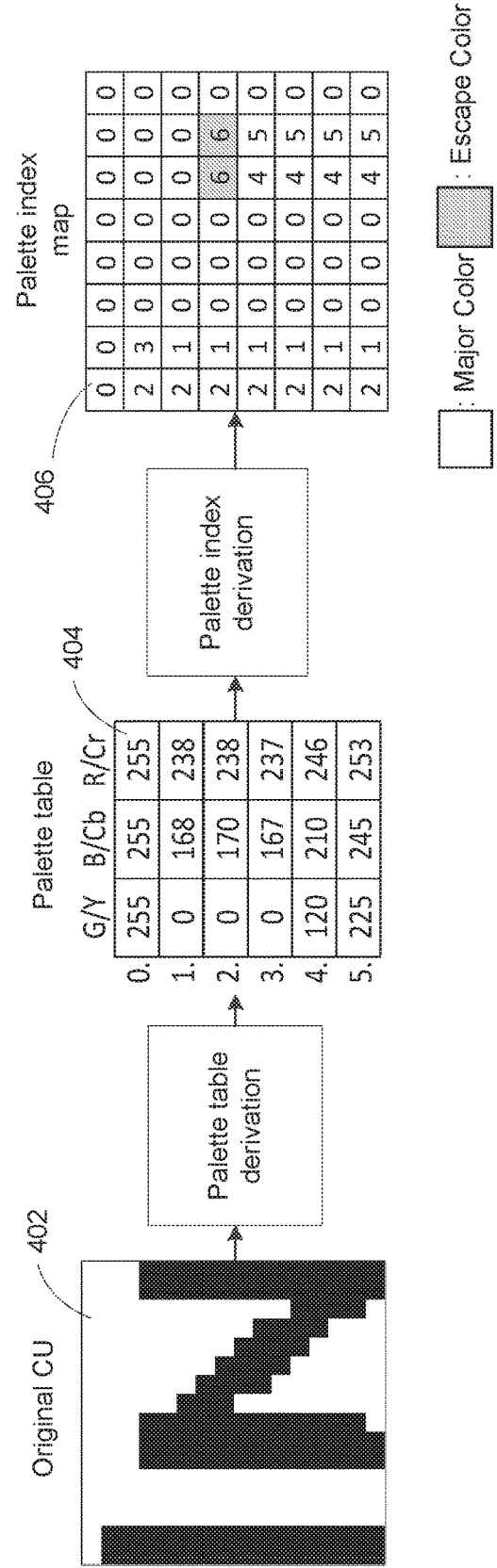
FIG. 4A illustrates an example palette coding implementation in which a palette table and a palette index map may be created to represent a coding unit.

FIG. 4A illustrates an example palette coding implementation. As described herein, a video block may be dominated by a number of major colors. The color of a pixel may be the same as that of a pixel above it or to its left. A palette table and a palette index map may be generated to represent these characteristics. For example, a palette table 404 may be derived for a coding unit (CU) 402. The palette table 404 may include a set of major colors (e.g., all of the major colors) of the CU 402. A palette index map 406 may be created to represent the pixels of the CU 402. The pixels may have one of the major colors (e.g., the major colors stored in the palette table 404) or an escape color (e.g., a color not included in the palette color table 404). The indices of the colors from the palette color table 404, as opposed to actual color values, may be used to represent the pixels having major colors in the palette index map. For example, if the palette table 404 contains K entries (e.g., K major colors), palette indices between 0 and K−1 may be used to represent those pixels having one of the K major colors, while an index of K may be used to represent those pixels having escape colors. This example design may be illustrated by FIG. 4A. The palette table 404 may include six major colors. For those pixels with one of the six major colors, indices 0-5 (e.g., the indices of the major colors in the palette table 404) may be used to represent the pixels in the palette index map 406. For those pixels with escape colors, an index value of 6 may be used to represent the pixels in the palette index map.

Figure 4B:
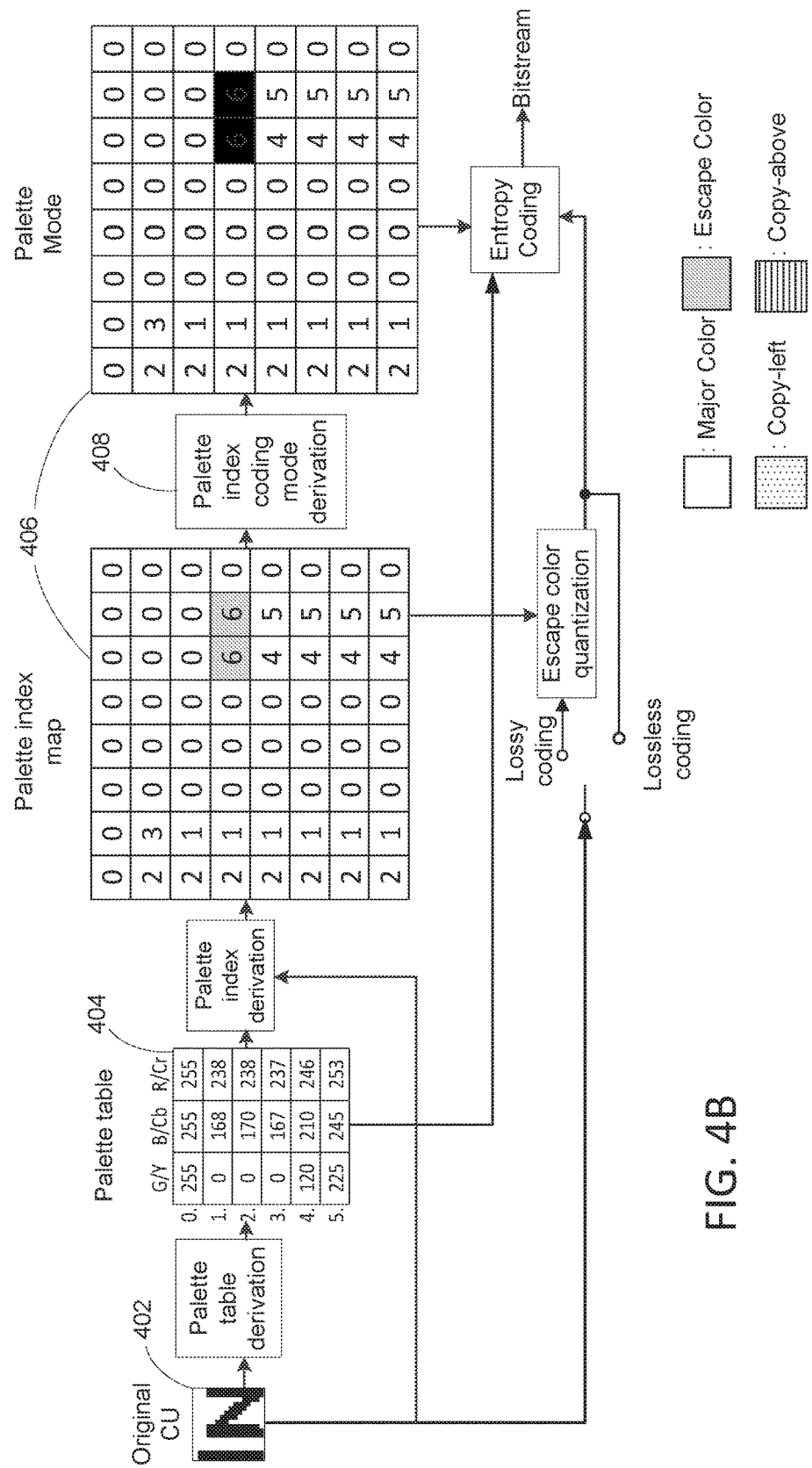
FIG. 4B illustrates example palette coding of a coding unit.

A video coding system (e.g., such as the video coding system 100) may encode the palette index map of a coding unit. FIG. 4B illustrates an example palette coding implementation. As shown, the palette table 404 and palette index map 406 may be used to palette-code the coding unit 402. A palette index coding mode may be selected at 408 for a pixel (e.g., every pixel) of the coding unit 402 (e.g., as represented by an entry in the palette index map 406). If the pixel has a major color, the index of the color (e.g., an index value between 0 and 5, as shown in FIG. 4B) may be encoded instead of the actual value of the major color. If the pixel has an escape color (e.g., as indicated by an index value of 6), the actual value of the escape color may be directly encoded. For example, if lossy coding is used, the quantized escape color value may be directly encoded.

One or more pixels of the coding unit 402 may have the same palette index value as another pixel (also referred to herein as a reference pixel). The palette indices of these pixels may be predicted using a prediction mode. Example prediction modes may include an index mode and a copy-above mode. In an example index mode implementation, the palette indices of one or more subsequent pixels (e.g., the pixels in the top row of the palette index map 406) may be predicted based on the palette index of a current pixel. In such cases, instead of coding the indices of the subsequent pixels, a run-length value $R_i$ may be signaled to a decoding device. The run-length value $R_i$ may indicate the number of subsequent pixels that may have the same palette index as the current pixel or reference pixel. The sample values of the $R_i$ pixels may then be copied from the reference pixel. In an example copy-above mode implementation, the palette index of a subsequent pixel (e.g., such as the pixels in the bottom row of the palette index map 406) may be predicted based on the palette index of a reference pixel located above the subsequent pixel (e.g., directly above the subsequent pixel). In such cases, instead of coding the indices of one or more subsequent pixels, a run-length value $R_c$ may be signaled to a decoding device. The run-length value $R_c$ may indicate the number of subsequent pixels that have the same palette index values as the respective neighboring pixels above them (e.g., directly above them). The sample values of the next $R_c$ pixels may then be copied from the reference pixels above them. It should be noted that the run-length value referred to herein (e.g., in either or both of the index mode and copy-above mode) does not count the position of the current pixel (e.g., the reference pixel). For example, if the number of consecutive pixels having the same palette index value as the reference pixel is N, the corresponding run-length value may be N−1.

Table 1 illustrates example syntax for palette coding in which a coding mode (e.g., denoted as palette_run_type_flag) and/or a run-length value (e.g., denoted as paletteRun) may be signaled for one or more pixels.

TABLE 1

Example Palette Mode Syntax

| | Descriptor |
|---|---|
| palette_coding( x0, y0, nCbS ) { | |
|   palette_share_flag[ x0 ][ y0 ] | ae(v) |
|   if( !palette_share_flag[ x0 ][ y0 ] ) { | |
|     palettePredictionFinished = 0 | |
|     paletteNumPredictedEntries = 0 | |
|     for( i = 0; i < PredictorPaletteSize && | |
|     !palettePredictionFinished | |
|     && paletteNumPredictedEntries < palette_max_size, i++) { | |
|       palette_predictor_run | ae(v) |
|       if(palette_predictor_run != 1) | |
|         if( palette_predictor_run > 1 ) | |
|           i += palette_predictor_run − 1 | |
|         PalettePredictorEntryReuseFlag[i] = 1 | |
|         paletteNumPredictedEntries ++ | |
|       } else | |
|         palettePredictionFinished = 1 | |
|     } | |
|     if( paletteNumPredictedEntries < palette_max_size ) | |
|       palette_num_signalled_entries | ae(v) |
|     for( cIdx = 0; cIdx < 3; cIdx++ ) | |
|       for( i = 0; i < palette_num_signalled_entries; i++ ) | |
|         palette_entry | ae(v) |
| } | |
| if( currentPaletteSize != 0 ) | |
|   palette_escape_val_present_flag | ae(v) |
| if( palette_escape_val_present_flag ) { | |
|   if( cu_qp_delta_enabled_flag && !IsCuQpDeltaCoded ) { | |
|     cu_qp_delta_palette_abs | ae(v) |
|     if( cu_qp_delta_palette_abs ) | |
|       cu_qp_delta_palette_sign_flag | ae(v) |
|   } | |
|   if( cu_chroma_qp_offset_enabled_flag && | |
|   !IsCuChromaQpOffsetCoded ) { | |
|     cu_chroma_qp_palette_offset_flag | ae(v) |
|     if( cu_chroma_qp_offset_flag && | |
|     chroma_qp_offset_list_len_minus1 > 0) | |
|       cu_chroma_qp_palette_offset_idx | |
|   } | |
| } | |
| if( indexMax > 0 ) | |
|   palette_transpose_flag | ae(v) |
| scanPos = 0 | |
| while( scanPos < nCbS * nCbS ) { | |
|   xC = x0 + travScan[ scanPos ][ 0 ] | |
|   yC = y0 + travScan[ scanPos ][ 1 ] | |
|   if( scanPos > 0) { | |
|     xcPrev = x0 + travScan[ scanPos − 1 ][ 0 ] | |
|     ycPrev = y0 + travScan[ scanPos − 1 ][ 1 ] | |
|   } | |
|   if( indexMax > 0 && scanPos > = nCbS && | |
|   palette_run_type_flag[ xcPrev ][ ycPrev ] ! = | |
|   COPY_ABOVE_MODE ) { | |
|     palette_run_type_flag[ xC ][ yC ] | ae(v) |
|   } | |
|   if( palette_run_type_flag[ xC ][ yC ] == | |
|   COPY_INDEX_MODE | |
|   && adjustedIndexMax > 0) | |
|     palette_index_idc | ae(v) |
|   if( indexMax > 0) { | |
|     maxPaletteRun = nCbS * nCbS − scanPos − 1 | |
|     if( maxPaletteRun > 0 ) { | |
|       palette_run_msb_id_plus1 | ae(v) |
|       if( palette_run_msb_id_plus1 > 1 ) | |
|         palette_run_refinement_bits | ae(v) |
|     } | |
|   } else | |
|     paletteRun = nCbS * nCbS − 1 | |
|   runPos = 0 | |
|   while ( runPos < = paletteRun ) { | |
|     xR = x0 + travScan[ scanPos ][ 0 ] | |
|     yR = y0 + travScan[ scanPos ][ 1 ] | |

TABLE 1-continued

Example Palette Mode Syntax

| palette_coding( x0, y0, nCbS ) { | Descriptor |
|---|---|
|     if( palette_run_type_flag[ xC ][ yC ] ==<br>    COPY_INDEX_MODE && paletteIndex ==<br>    indexMax ) {<br>        PaletteSampleMode[ xR ][ yR ] = ESCAPE_MODE<br>        PaletteIndexMap[ xR ][ yR ] = paletteIndex<br>        for( cIdx = 0; cIdx < 3; cIdx++ ) {<br>            palette_escape_val<br>            PaletteEscapeVal[ cIdx ][ xR ][ yR ] =<br>            palette_escape_val<br>        }<br>    } else if(palette_run_type_flag[ xC ][ yC ] ==<br>    COPY_INDEX_MODE ) {<br>      PaletteSampleMode[ xR ][ yR ] =<br>      COPY_INDEX_MODE<br>      PaletteIndexMap[ xR ][ yR ] = paletteIndex<br>    } else {<br>      PaletteSampleMode[ xR ][ yR ] =<br>      COPY_ABOVE_MODE<br>      PaletteIndexMap[ xR ][ yR ] =<br>      PaletteIndexMap[ xR ][ yR − 1 ]<br>    }<br>    runPos++<br>    scanPos++<br>  }<br> }<br>} | <br><br><br><br><br><br><br>ae(v)<br> |

Run-length values may be binarized. For example, the most significant bits (MSBs) of the run-length values may be coded using unary code while refinement bits may be coded using 0th-order Exponential-Golomb code. The run-length value may be binarized by concatenating the corresponding coded MSBs and the refinement bits. Table 2 illustrates binarized results for various run-length values using the binarization technique described herein. "X," "XX" or "XXX" in the table may represent fixed-length coding of 1-, 2-, or 3-bit.

TABLE 2

Example Binarization of Run-length Values

| Run-length | MSB bins | Refinement bins |
|---|---|---|
| 0 | 0 | — |
| 1 | 10 | — |
| [2, 3] | 110 | X |
| [4, 7] | 1110 | XX |
| [8, 15] | 11110 | XXX |
| ... | ... | ... |

Figure 5A:
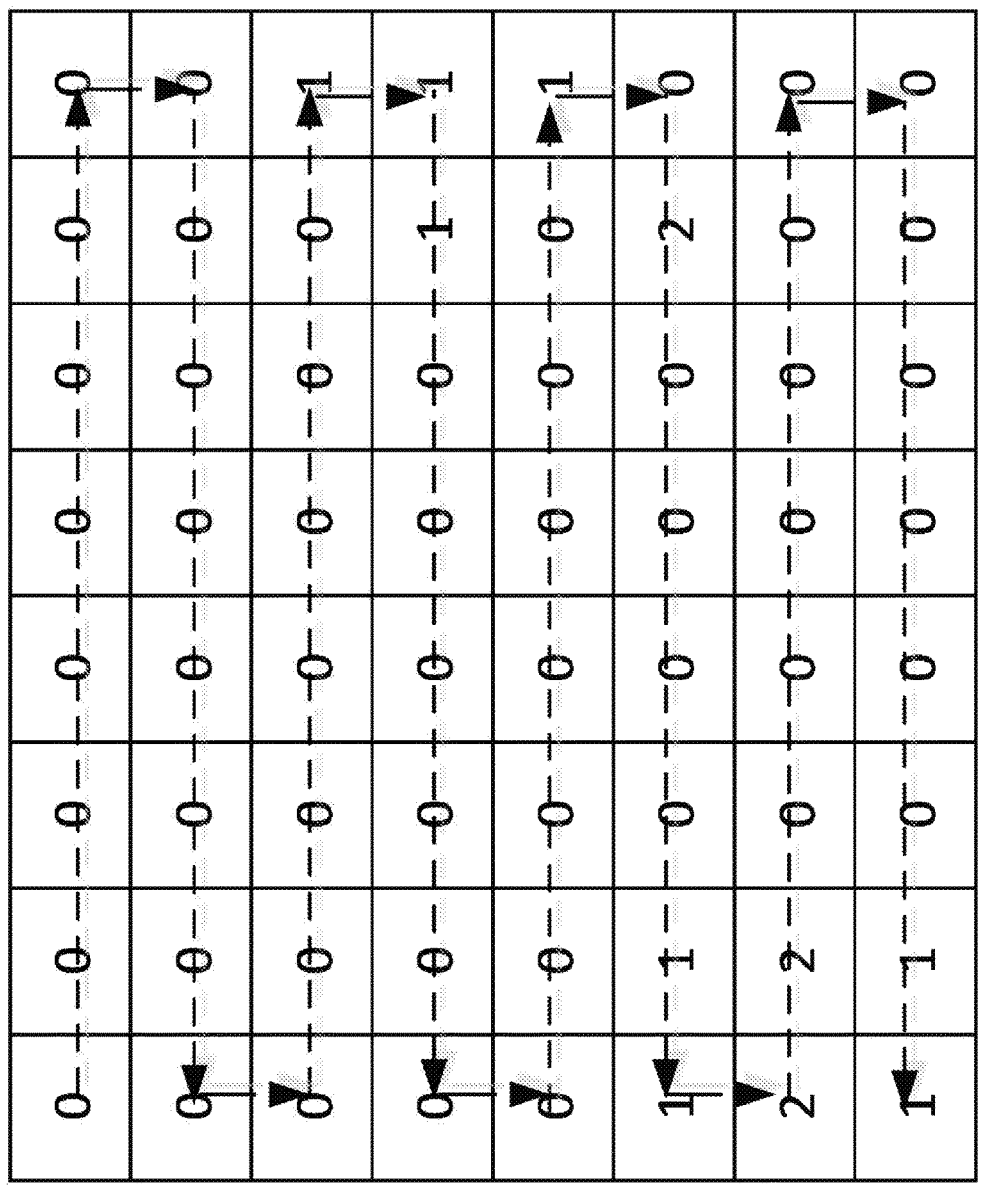
FIG. 5A illustrates an example horizontal scan of a palette index map associated with a coding unit.
Figure 5B:
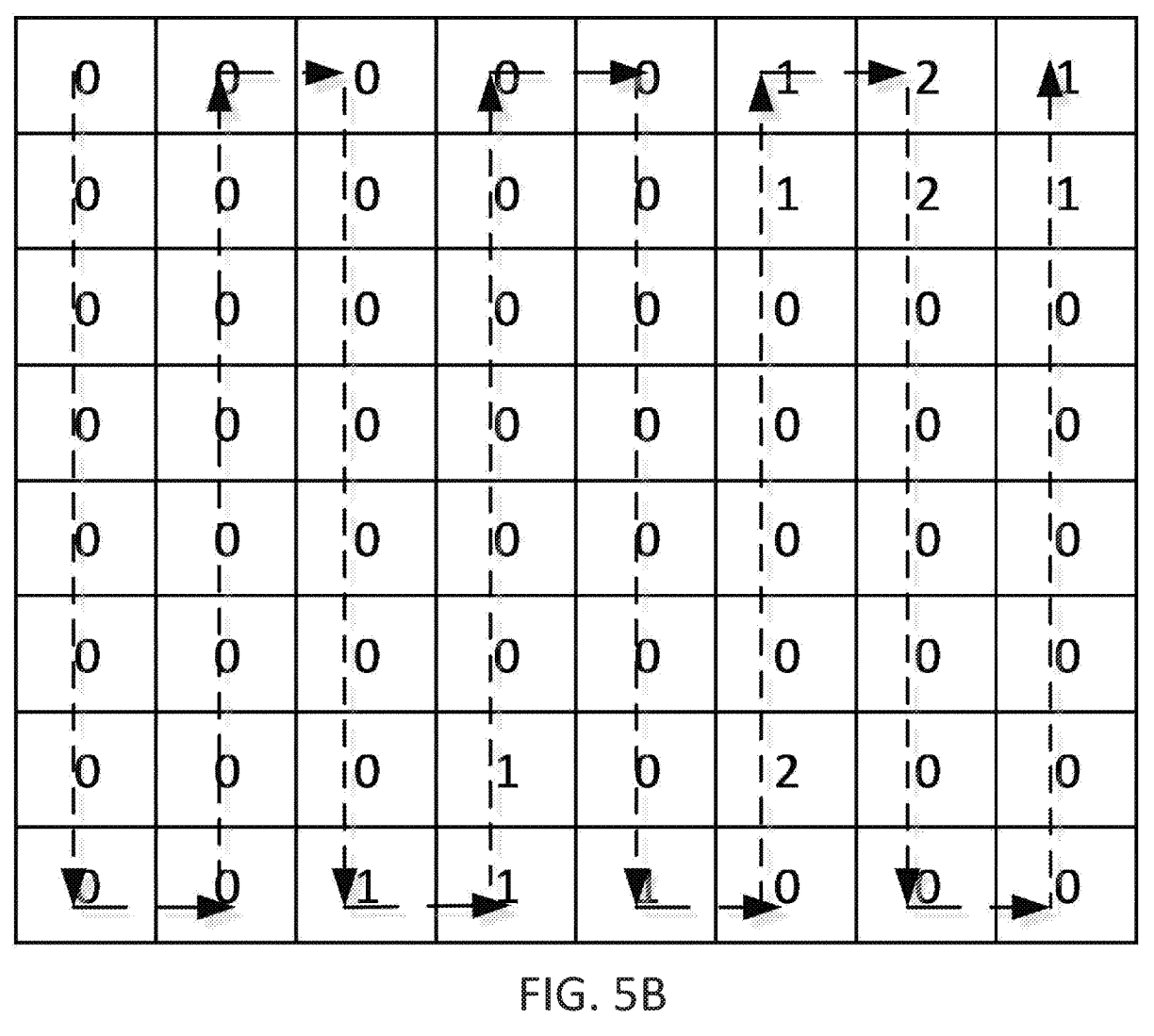

For a current pixel, the maximum value of its run-length may be bounded by the distance between the pixel and the end of the coding unit. For example, the coding unit may have 8×8 or 64 pixels. The pixels may have corresponding palette indices, which may form an 8×8 palette index map (e.g., having 64 positions). The palette index map may be scanned in a specific scan order. The scan order may be pre-defined. For example, the palette index map may be scanned in a horizontal direction (e.g., as shown in FIG. 5A), or in a vertical direction (e.g., as shown in FIG. 5B). The 64 pixels may correspond to scan positions 0-63. If the current pixel is at scanning position 57, then the maximum run-length value for the current pixel may be 6, at which point the end of the palette index map may be reached. In this example scenario, the MSB bins for the [4, 7] range may be set to be 111 instead of 1110; the refinement bins may be generated by binarizing the remainder, for example, using truncated binary code with the maximum value being equal to 2 (e.g., the run-length minus 4). Syntax elements may be assigned to code the MSB bins and the refinement bins. For example, in the example syntax shown in Table 1, two elements palette_run_msb_id_plus1 and palette_run_refinement_bits may be assigned to code the MSB bins and the refinement bins, respectively. Element palette_run_msb_id_plus1 may be coded as regular bins with 8 context models. Element palette_run_refinement_bits may be coded as bypass bins. Table 3 illustrates how the context model for the syntax element palette_run_msb_id_plus1 may be selected.

TABLE 3

Example Context Mode Selection for Syntax Element palette_run_msb_id_plus1

| binIdx | 0 | 1 | 2 | 3 | 4 | >4 |
|---|---|---|---|---|---|---|
| palette_run_type_flag = COPY_ABOVE_MODE | 5 | 6 | 6 | 7 | 7 | bypass |
| palette_run_type_flag = INDEX_MODE | 0, 1, 2 | 3 | 3 | 4 | 4 | bypass |

For a palette-coded coding unit, a "run-to-the-end" flag may be signaled (e.g., via a syntax element palette_run_to_end_flag). The "run-to-the-end" flag may indicate that the current run (e.g., in either index mode or copy-above mode) may continue to the end of the coding unit. For example, the current run may be coded using exponential Golomb code. The syntax element palette_run_msb_id_plus1 may indicate the length of refinement bits. The "run-to-the-end" flag may be signaled when (e.g., only when) the range of possible run-length values at the current position, which may be determined based on the value of palette_run_msb_id_plus1 covers a maximum possible run-length value $pRun^{max}$. Such a condition may be expressed as follows:

$$pRun^{max} \le (1 << \text{palette\_run\_msb\_id\_plus1}) - 1 \quad (1)$$

Table 4 shows example palette coding syntax that includes a "run-to-the-end" flag (e.g., palette_run_to_end_flag).

TABLE 4

Example Palette Mode Syntax with palette_run_to_end_flag

| ... | |
|---|---|
| if( maxPaletteRun > 0 ) {<br>  palette_run_msb_id_plus1<br>  if( palette_run_msb_id_plus1 > 1 ) {<br>    if( scanPos && (1<<<br>    palette_run_msb_id_plus1) > MaxPaletteRun )<br>      palette_run_to_end_flag<br>    if( !palette_last_ran_flag )<br>      palette_run_refinement_bits<br>  }<br>}<br>... | <br>ae(v)<br><br><br><br>ae(v)<br><br>ae(v)<br> |

Figure 6A:
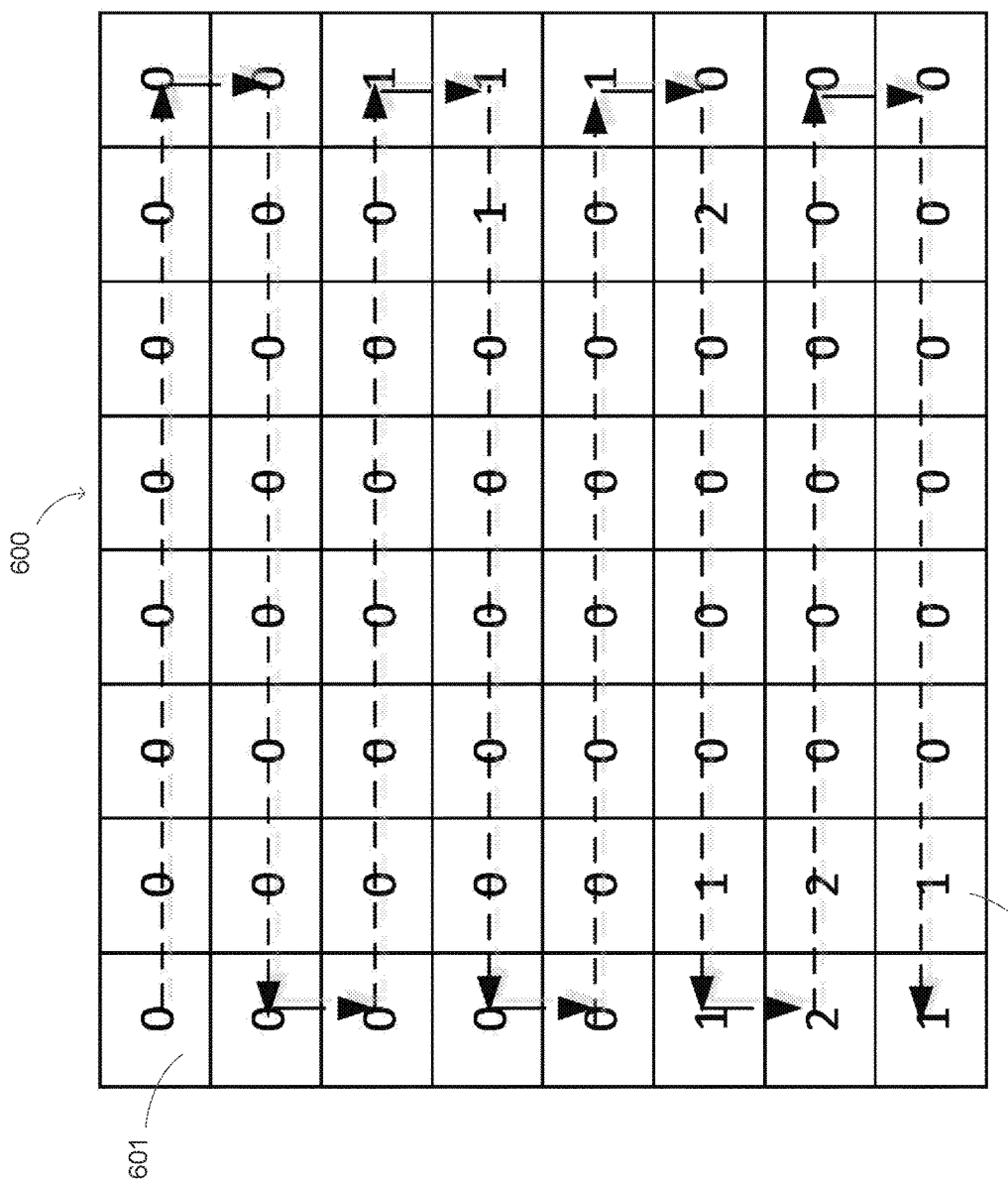
FIG. 6A illustrates an example palette index map having a large run-length value at the beginning of the palette index map.
Figure 6B:
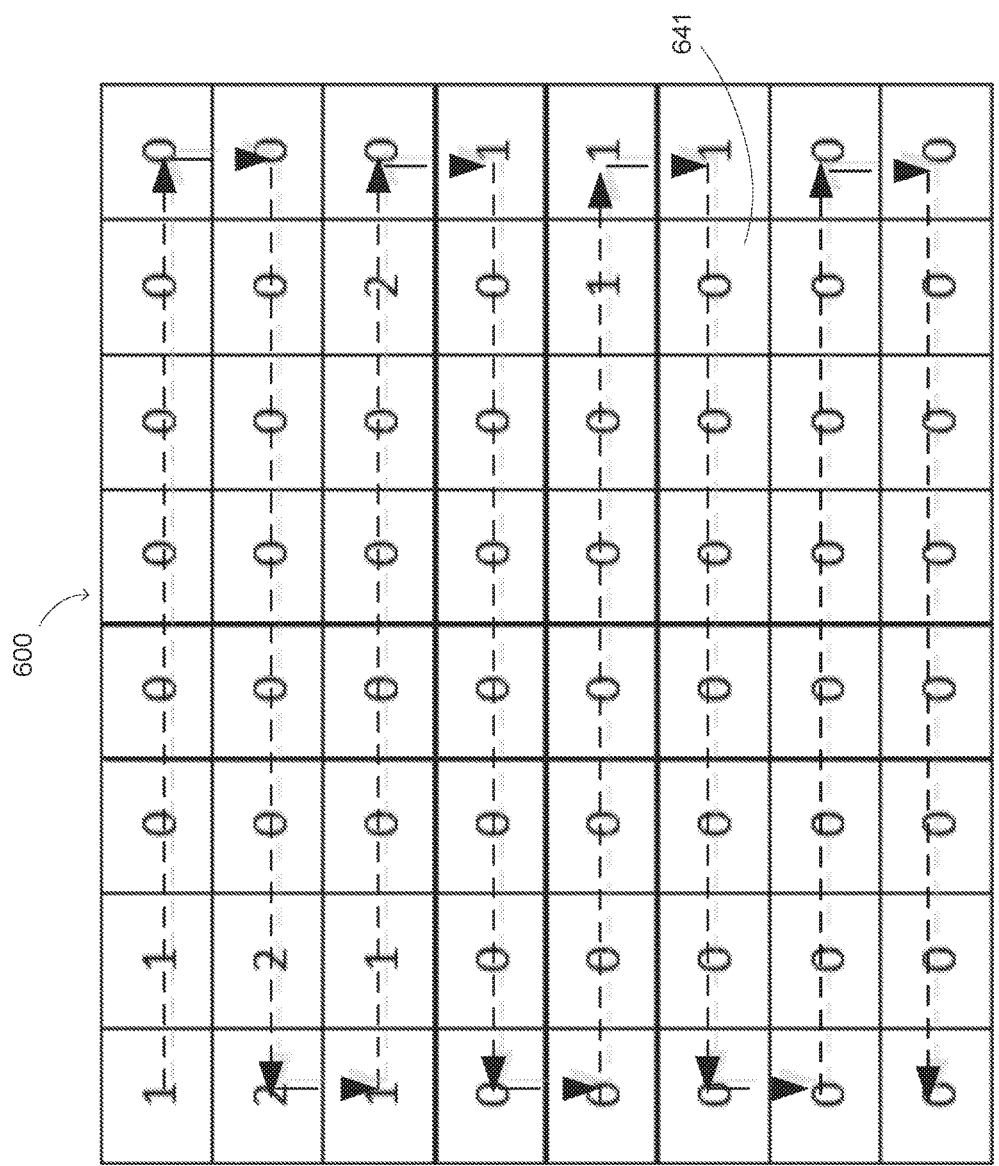
FIG. 6B illustrates the example palette index map of FIG. 6A after a vertical flip.

In some cases, a large run of similar pixels (e.g., consecutive pixels that may have a same palette index value) may be present at the end of a coding unit and the "run-to-the-end" flag may be used to code those pixels. In some cases, however, a large run of similar pixels (e.g., consecutive pixels that may have a same palette index value) may be present at the beginning of the coding unit while a small run of similar pixels may be present at the end of the coding unit. For example, a first run of the coding unit may have a same run-length as or a greater run-length than a last run of the coding unit. FIG. 6A shows such an example coding unit 600. As shown, if scanned horizontally, the coding unit 600 may have a run-length of 22 at the beginning of the coding unit (e.g., the 22-pixel first run following the starting pixel 601 in index mode) and a run-length of 1 at the end of the coding unit (e.g., the 1-pixel last run starting at pixel 655 in index mode). Applying the "run-to-the-end" flag to the coding unit 600 as is may cover only the small run at the end of the coding unit (e.g., with a run-length value of 1). If the coding unit 600 is flipped (e.g., by flipping the palette index map associated with the coding unit) in a direction orthogonal to the scan order (e.g., in an upside down manner), the large run at the beginning of the coding unit (e.g., with a run-length value of 22) may be swapped to the end (e.g., as shown in FIG. 6B). Applying the "run-to-the-end" flag to the flipped coding unit may cover a much larger run, e.g., a run-length of 22 as compared to a run-length of 1.

Even though the example given here shows that the flipping is performed in a vertical direction (e.g., in an upside down manner), a person with ordinary skills in the art will appreciate that other manners of flipping the coding unit (or the palette index map associated with the coding unit) may be possible to take advantage of the "run-to-the-end" flag. For example, where a vertical scan of the coding unit creates a large run at the beginning of the coding unit (e.g., a first run) and a small run at the end of the coding unit (e.g., a last run), the coding unit (or the palette index map associated with the coding unit) may be flipped horizontally (e.g., from left to right) such that the large run at the beginning may be swapped to the end. In some cases, the coding unit (or the palette index map associated with the coding unit) may be flipped twice in order to create a large run at the end of the coding unit. The two flipping operations may be in directions orthogonal to each other. That is, the coding unit (or the palette index map associated with the coding unit) may be flipped horizontally first and then vertically; or, the coding unit (or the palette index map associated with the coding unit) may be flipped vertically first and then horizontally. The exact order of the flipping operations may not be significant as long as similar results may be achieved.

A video coding device (e.g., such as the video coding system 100) may provide an indication of whether a coding unit (or a palette index map associated with the coding unit) has been flipped to a video bitstream (e.g., the bitstream 120). The indication may be provided as part of the palette coding information described herein. The indication may be used to signal that the coding unit (or the palette index map associated with the coding unit) has been flipped once. The indication may also be used to signal that the coding unit (or the palette index map associated with the coding unit) has been flipped twice. The indication may comprise a flag, e.g., a syntax element palette_flipping_flag as shown in Table 5. A value of 1 (or true) for the flag may indicate that the coding unit (or the palette index map associated with the coding unit) has been flipped while a value of 0 (or false) may indicate otherwise. Other ways to provide the indication may be possible including, for example, utilizing a bit sequence. Furthermore, instead of using a specific value to indicate that the coding unit (or the palette index map associated with the coding unit) has not been flipped, the video coding device may decide not to send the indication in that situation.

TABLE 5

Example Palette Mode Syntax with a Palette Flipping Flag

| | Descriptor |
|---|---|
| palette_coding( x0, y0, nCbS ) { | |
|   palette_share_flag[ x0 ][ y0 ] | ae(v) |
|   ...... | |
|   if( indexMax > 0){ | |
|     palette_transpose_flag | ae(v) |
|     palette_flipping_flag | ae(v) |
|   } | |
|   ...... | |
| } | |

The video bitstream described herein may include other palette coding information. For example, the palette coding information may describe the palette table used to encode the current coding unit, the palette index map of the current coding unit, and/or the scan order of the current coding unit.

Figure 7:
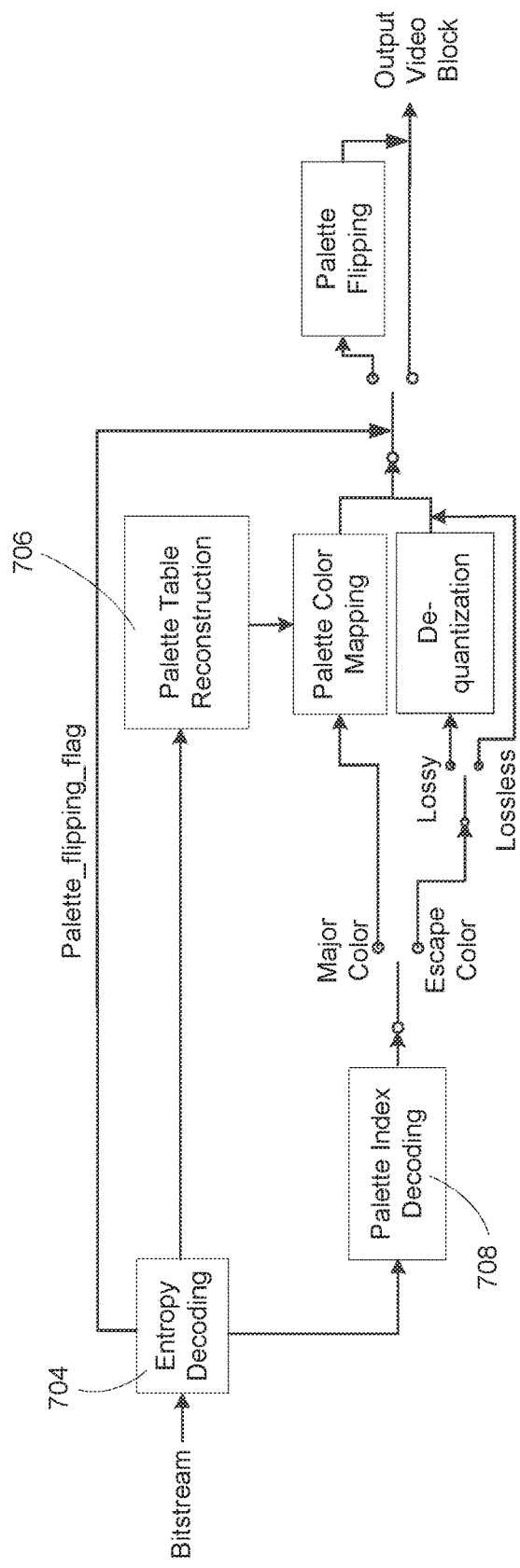
FIG. 7 illustrates example decoding of a palette-coded video signal.

A video coding device (e.g., the video coding system 200) may receive a video bitstream (e.g., the video bitstream 202) and reconstruct a coding unit of the video bitstream based on palette coding information contained in the bitstream. FIG. 7 illustrates example reconstruction of a palette-coded video coding unit. As described herein, the palette coding information may describe the palette table used to encode the coding unit and/or the palette index map of the coding unit. The palette coding information may indicate the scan order of the coding unit and/or whether the coding unit (or the palette index map associated with the coding unit) has been flipped during encoding.

The video bitstream may be entropy-decoded (e.g., at entropy decoding unit 704). The palette table information may be sent to a palette table reconstruction unit 706 to form the palette table used during encoding. The palette table may contain the major colors of the coding unit. The palette index map information (e.g., palette indices and run lengths) may be sent to a palette index decoding unit 708. The palette index map of the coding unit may be regenerated. If a pixel of the coding unit is coded as a major color, the pixel's palette index may be used to retrieve the corresponding major color from the palette table. If the pixel is coded as an escape color (e.g., if the palette index of the pixel is greater than the maximum palette index value of the palette table), the actual escape color value may be decoded. The decoded value of the escape color may be directly used (e.g., if lossless coding is applied) or de-quantized (e.g., if lossy coding is applied) to reconstruct the pixel.

The video coding device may determine whether the coding unit (or the palette index map associated with the coding unit) has been flipped during encoding. The determination may be made based on the palette coding information. For example, the video coding device may check the presence and/or value of a palette flipping flag (e.g., a flag denoted as palette_flipping_flag) to determine whether the coding unit (or the palette index map associated with the coding unit) has been flipped. If such a flag is not present in the bitstream or if the flag has a value of 0 (or false), the video coding device may determine that the coding unit (or the palette index map associated with the coding unit) has not been flipped. If the flag is present and has a value indicating that the coding unit (or the palette index map associated with the coding unit) has been flipped (e.g., a value of 1 or true), the video coding device may interpret the meaning of the flag in at least two ways.

The video coding device may interpret the flag as indicating that the coding unit (or the palette index map associated with the coding unit) has been flipped once during encoding. The video coding device may further determine a direction of the flipping. Such direction may be determined based on a scan order of the coding unit, which may be indicated in the bitstream. More specifically, the video coding unit may determine that the direction of the flipping is orthogonal to the scan order. For example, if the scan order is horizontal (e.g., as shown in FIGS. 5A and 6A), the video coding device may determine that the flipping has been performed in a vertical direction (e.g., in an upside down manner); if the scan order is vertical (e.g., as shown in FIG. 5B), the video coding device may determine that the flipping has been performed in a horizontal direction (e.g., in a left to right manner).

The video coding device may interpret the flag as indicating that the coding unit (or the palette index map associated with the coding unit) has been flipped twice during encoding. The video coding device may assume that the two flipping operations have been performed in orthogonal directions (e.g., a vertical flip followed by a horizontal flip, or vice versa).

Upon making the determination regarding the flipping, the video coding device may process the coding unit in accordance with the determination. For example, if the determination is that the coding unit (or the palette index map associated with the coding unit) has been flipped once during encoding, the video coding device may use the determined direction of the flipping to perform an inverse flipping of the coding unit (or the palette index map associated with the coding unit) to restore the pixels of the coding unit to their original positions in the coding unit. For instance, if it is determined that the coding unit (or the palette index map associated with the coding unit) has been flipped vertically (e.g., upside down), the inverse flipping may restore the coding unit (or the palette index map associated with the coding unit) to right side up; if it is determined that the coding unit (or the palette index map associated with the coding unit) has been flipped horizontally (e.g., from left to right), the inverse flipping may turn the coding unit (or the palette index map associated with the coding unit) from right to left to restore the original positions of the sides. If the determination is that the coding unit (or the palette index map associated with the coding unit) has been flipped twice during encoding, the video coding unit may assume that the two flipping operations have been performed in orthogonal directions, in which case the video coding device may flip the coding unit (or the palette index map associated with the coding unit) twice, also in orthogonal directions, without considering the order of the original flipping operations. For instance, the video coding device may flip the coding unit vertically first and then horizontally, or vice versa, to restore the pixels of the coding unit to their original positions in the coding unit.

As described herein, an example reconstruction of a video signal palette-coded in intra prediction mode may be described as follows.

Inputs to the reconstruction may be a luma location (xCb, yCb), which may specify the top-left sample of a current luma coding block or coding unit relative to the top-left luma sample of a current picture, and a variable $log_2$ CbSize, which may specify the size of the current luma coding block. Output of the reconstruction may be a modified reconstructed picture before deblocking filtering. Quantization parameters may be derived by invoking the luma location (xCb, yCb) as input. A variable nCbS may be set equal to $1<<log_2$ CbSize. Depending on the values of pcm_flag[xCb] [yCb], palette_mode_flag[xCb][yCb], and IntraSplitFlag, the luma samples may be decoded as follows.

If pcm_flag[xCb][yCb] is equal to 1, the reconstructed picture may be modified as SL[xCb+i][yCb+j]= pcm_sample_luma[(nCbS*j)+i]<<(BitDepthY−PcmBitDepthY), with i, j=0 . . . nCbS−1.

If pcm_flag[xCb][yCb] is equal to 0 and palette_mode_flag[xCb][yCb] is equal to 1, the following may apply. Decoding for palette intra blocks may be invoked with one or more of following as input: the luma location (xCb, yCb), nCbS, a variable cIdx, the value of which may be set to 0, an array paletteSampleMode, a palette indices array paletteIndexMap, and/or an array of escape values (e.g., quantized escape values) palettcEscapeVal. The output of the decoding process may be an nCbS*nCbS array of reconstructed palette sample values, recSamples[x][y], with x, y=0 . . . nCbS−1. The reconstructed picture may be modified. For example, if both palette_transpose_flag and palette_flipping_flag are true, $S_L$[yCb+y][xCb+x] may be set equal to recSamples[x][nCbS−y]. If palette_transpose_flag is true and palette_flipping_flag is false, $S_L$[yCb+y][xCb+x] may be set equal to recSamples[x][y]. If palette_transpose_flag is false and palette_flipping_flag is true. $S_L$[xCb+x][yCb+y] may be set equal to recSamples[x][nCbS−y]. If both palette_transpose_flag and palette_flipping_flag are false, $S_L$[xCb+x][yCb+y] may be set equal to recSamples[x][y].

When ChromaArrayType is not equal to 0, the following may apply. The variable $log_2$ CbSizeC may be set equal to $log_2$ CbSize−(ChromaArrayType==3? 0:1). Depending on the values of pcm_flag[xCb][yCb] and IntraSplitFlag, the chroma samples may be decoded as follows.

If pcm_flag[xCb][yCb] is equal to 1, the reconstructed picture may be modified. For example, $S_{Cb}$[xCb/SubWidthC+i][yCb/SubHeightC+j] may be set equal to pcm_sample_chroma[(nCbS/SubWidthC*j)+i]<<(BitDepth$_C$−PcmBitDepth$_C$), with i=0 . . . nCbS/SubWidthC−1 and j=0 . . . nCbS/SubHeightC−1. $S_{Cr}$[xCb/SubWidthC+i][yCb/SubHeightC+j] may be set equal to pcm_sample_chroma[(nCbS/SubWidthC*(j+nCbS/SubHeightC))+i]<<(BitDepth$_C$−PcmBitDepth$_C$), with i=0 . . . nCbS/SubWidthC−1 and j=0 . . . nCbS/SubHeightC−1.

If pcm_flag[xCb][yCb] is equal to 0 and palette_mode_flag[xCb][yCb] is equal to 1, the following may apply.

Decoding for palette intra blocks may be invoked with one or more of the following as inputs: the chroma location (xCb, yCb), nCbS, a variable cIdx, the value of which may be set to 1, an array paletteSampleMode, a palette indices array paletteIndexMap, and/or an array of escape values (e.g., quantized escape values) paletteEscapeVal. The output may be an nCbS*nCbS array of reconstructed palette sample values, recSamples[x][y], with x, v=0 . . . nCbS−1. The reconstructed picture may be modified. For example, if both palette_transpose_flag and palette_flipping_flag are true, $S_{Cb}$[yCb/SubHeightC+y][xCb/SubWidthC+x] may be set equal to recSamples[x][nCbS/SubHeightC−y]. If palette_transpose_flag is true and palette_flipping_flag is false, $S_{Cb}$[yCb/SubHeightC+y][xCb/SubWidthC+x] may be set equal to recSamples[x][y]. If palette_transpose_flag is false and palette_flipping_flag is true, $S_{Cb}$[xCb/SubWidthC+x][yCb/SubHeightC+y] may be set equal to recSamples[x][nCbS/SubHeightC−y]. If both palette_transpose_flag and palette_flipping_flag are false, $S_{Cb}$[xCb/SubWidthC+x][yCb/SubHeightC+y] may be set to recSamples[x][y].

Decoding for palette intra blocks may be invoked again with one or more of the following as inputs: the chroma location (xCb, yCb), nCbS, the variable cIdx, the value of which may be set to 2, the array paletteSampleMode, the palette indices array paletteIndexMap, and/or the array of escape values (e.g., quantized escape values) paletteEscapeVal. The output may be an nCbS*nCbS array of reconstructed palette sample values, recSamples[x][y], with x, y=0 . . . nCbS−1. The reconstructed picture may be modified. For example, if both palette_transpose_flag and palette_flipping_flag are true, $S_{Cb}$[yCb/SubHeightC+y][xCb/SubWidthC+x] may be set equal to recSamples[x][nCbS/SubHeightC−y]. If palette_transpose_flag is true and palette_flipping_flag is false, $S_{Cb}$[yCb/SubHeightC+y][xCb/SubWidthC+x] may be set equal to recSamples[x][y]. If palette_transpose_flag is false and palette_flipping_flag is true, $S_{Cb}$[xCb/SubWidthC+x][yCb/SubHeightC+y] may be set equal to recSamples[x][nCbS/SubHeightC−y]. If both palette_transpose_flag and palette_flipping_flag are false, $S_{Cb}$[xCb/SubWidthC+x][yCb/SubHeightC+y] may be set equal to recSamples[x][y].

The example decoding process described herein may be applied for different value combinations of palette_transpose_flag and palette_flipping_flag and for the luma and chroma components. Although an example implementation of the "flipping" operation is described, e.g., the pixel value at position "nCbS−y" in the y axis is decoded to that position and "flipped" (e.g., moved or copied in memory) to replace the pixel value at position "y" in the y axis, other implementations of palette flipping may be used. For example, one or more scan orders (e.g., multiple different scan orders) may be stored (e.g., pre-stored) at the decoder. The scan orders may be used for different value combinations of palette_transpose_flag and palette_flipping_flag and/or for blocks with different sizes. A stored scan order may correspond to a pair of palette_transpose_flag and palette_flipping_flag values. For example, palette_transpose_flag and palette_flipping_flag may have one of the following value pairs: {0,0}, {0,1}, {1,0}, or {1,1}. The palette_transpose_flag and palette_flipping_flag value pair may have a corresponding scan order stored at the decoder. Depending on the values of palette_transpose_flag and palette_flipping_flag received in the video bitstream, a corresponding scan order may be selected and applied in the decoding. The selected scan order may be used to decode the pixels into a final ordering of the pixels. For example, the pixels may be transposed, flipped, both transposed and flipped, or neither transposed nor flipped. The effect of "flipping" may be achieved even though the pixel values are not decoded along an initial scan pattern and then moved or copied. Memory consumption and on-the-fly calculation of coordinate values may be reduced.

The result from flipping a palette-code coding unit (or a palette index map associated with the coding unit) may vary based on the characteristics of the coding unit. For example, a coding unit with a small block size and/or large number of major colors (e.g., a large palette table) may have small run-length values in either or both of the index mode and copy-above mode. In such case, the gain from flipping the coding unit (or the palette index map associated with the coding unit) may be outweighed by the signaling overhead involved. Accordingly, the application of the palette flipping operation may be conditioned on the block size and/or the palette table size of the coding unit. A pre-defined threshold may be used to determine whether to flip a coding unit (or a palette index map associated with the coding unit) and signal the flipping. For example, the pre-defined threshold may be set to a block size of 8×8 pixels and/or a palette table size of 10. A coding unit smaller than or equal to the threshold block size and/or having a palette table larger than the threshold palette table size may not be flipped (and flipping indication may be skipped).

Similar thresholds as described herein may be used to determine whether performance comparison (e.g., via testing) between applying and not applying palette flipping should be conducted for determining which of the two actions to take. Such performance comparison may be disabled if a coding unit's size is smaller than or equal to a predefined threshold block size (e.g., 8×8 pixels), and/or if the number of major colors in the coding unit is greater than a predefined threshold (e.g., a threshold of 10).

Performance comparison may be conducted between applying and not applying palette flipping for one or more, but not all, scan orders. As described herein, at least two scan orders (e.g., horizontal scan and vertical scan) may be supported in palette coding. Instead of comparing the performance of enabling and disabling palette flipping for all of the scan orders, the comparison may be performed for a subset of the scan orders (e.g., for only one scan order that offers the best coding performance). Further, palette flipping may be disabled for coding units that have larger last run-length than first run-length. This way, the "run-to-the-end" flag may be applied to the larger of the first run-length and the last run-length.

As described herein, at least two prediction modes, e.g., the index mode and copy-above mode, may be used in palette coding. The video coding device may determine which prediction mode to use and/or what the proper run-length is. In an example, the video coding device may derive and apply the largest possible run-length for a selected prediction mode (e.g., the index mode or the copy-above mode). Using the largest run-length may not be optimal, however, in at least some cases. For example, it may be possible to code one or more pixels of a coding unit in the index mode and one or more subsequent pixels in the copy-above mode. This is referred to herein as index-followed-by-copy-above. In these and other cases, different combinations of index and copy-above run-length values may be jointly considered, tested and/or compared to determine a prediction mode to use and/or the corresponding run-length.

Figure 8:
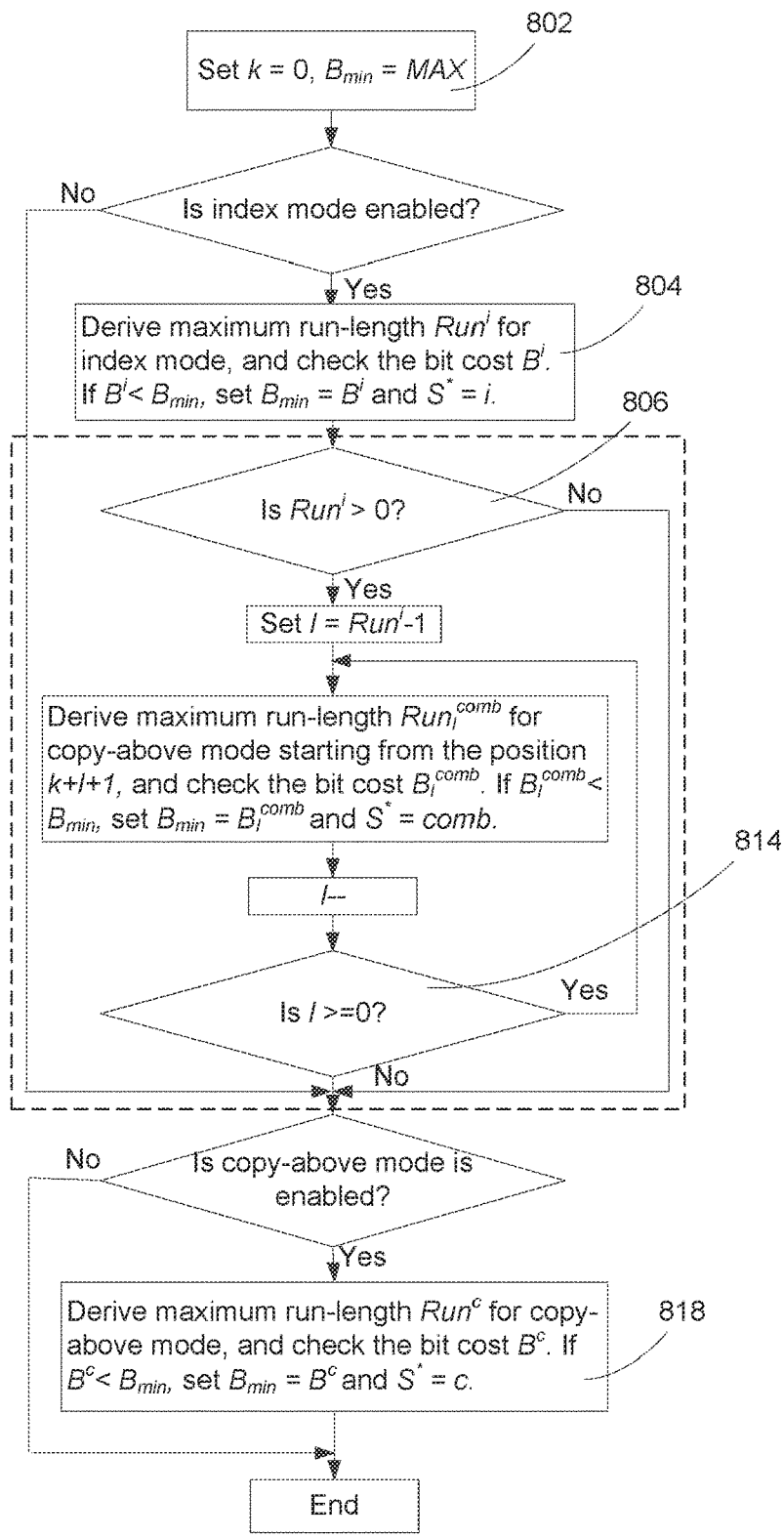
FIG. 8 shows a chart for an example palette mode selection method.

FIG. 8 illustrates an example method for selecting a palette prediction mode and/or run-length. At 802, a first pixel of a current coding unit is initialized as scan position k=0 and a bit cost is initialized as MAX (e.g., MAX may be set to a maximum cost value such as MAX_DOUBLE). If the index mode is disabled, the method may proceed to 818. Otherwise, at 804, starting from the current scan position k, a maximum run-length values $Run^i$ in the index mode may be derived for the current scan position. The bit cost $B^i$ associated with coding the palette indices of the next ($Run^i$+1) scan positions in the index mode may be calculated. $B^i$ may be expressed as $R(mode^{index}) + R(Index_k) + R(Run^i)$. The variable $Index_k$ may represent the palette index value at scan position k. The functions R(*) may represent the bit costs associated with signaling the index mode, the index value, and the index mode run-length at scan position k, respectively.

At 806-814, for one or more values of l between $Run^i$−1 and 0, a maximum run-length value $Run_l^{comb}$ in the copy-above mode may be derived for the pixel at scan position k+l+1. For one or more values of l, the bit cost $B_l^{comb}$ associated with coding the palette indices of the next (l+1) scan positions in the index mode and coding the palette indices of the following ($Run_l^{comb}$+1) scan positions in the copy-above mode may be calculated. The bit cost $B_l^{comb}$ may be expressed as $B_l^{comb} = R(mode^{comb}) + R(Index_k) + R(l) +$ R(Run$_l^{comb}$). The function R(mode$^{comb}$) may represent the bit cost associated with signaling the index mode at scan position k and the copy-above mode at scan position k+l+1. The function R(Index$_k$) may represent the bit cost associated with signaling the palette index value Index$_k$ at scan position k. The functions R(l) and R(Run$_l^{comb}$) may represent the bit costs associated with signaling the index mode run-length l and the copy-above mode run-length Run$_l^{comb}$, respectively. The minimum coding bit cost among all potential values of l may be saved as the minimum combination coding bit cost, B$_{min}^{comb}$, for index-followed-by-copy-above.

At 818, if the copy-above mode is enabled for the current scan position k, the bit cost B$^c$ for coding the palette indices of the next (Run$^c$+1) scan positions in the copy-above mode may be calculated. The bit cost may be expressed as B$^c$=R(mode$^{copy-above}$)+R(Run$^c$).

A per-pixel average coding bit cost may be calculated for the index mode coding bit cost B$^i$, copy-above mode coding bit cost B$^c$, and the minimum combination mode coding bit cost B$_{min}^{comb}$. For example, the per-pixel average coding bit cost may be derived by dividing the coding bit cost of each candidate coding mode by the number of pixels that could be coded using that coding mode. A palette coding mode may be selected for the current scan position k by comparing the per-pixel bit cost described herein. For example, the palette coding mode having the smallest per-pixel bit cost may be selected, as illustrated in the following:

$$S^* = \underset{S \in \{i,c,comb\}}{\mathrm{argmin}} \left\{ \frac{B^i}{Run^i + 1}, \frac{B^c}{Run^c + 1}, \min_{l \in [0, Run^i - 1]} \left\{ \frac{B_l^{comb}}{l + Run_l^{comb} + 2} \right\} \right\} \quad (3)$$

The palette mode selection method described herein may be repeated for one or more subsequent scan positions k, where k=k+Run$^{S*}$+1, until, for example, all positions in the current coding unit have been coded.

Various techniques may be employed to control the coding complexity associated with the palette mode selection method described herein. The method may be selectively applied. For example, the method may be enabled for coding units with large run-length values (e.g., bigger coding units) and disabled for small coding units (e.g., coding units with 8×8 pixels or less). The interval for testing the potential combinations of an index run followed by a copy-above run may be adjusted to control the number of tests to be conducted. For example, a threshold may be predefined for the overall run-length (e.g., l+Run$_l^{comb}$ in (3)). If the overall run-length is greater than the threshold, testing may be conducted for every two increments of l; otherwise, testing may be conducted for every one increment of l. The increment interval or step size of l may be adjusted. For example, a larger step size (e.g., a step size of 4) may be used initially (or the initial step size may be set based on the index mode run-length value Run$^i$). If the initial step size (e.g., a larger step size) fails to find a proper combined mode (e.g., index-followed-copy-above), or if the copy-above mode is not available, the step size may be decreased by certain amount (e.g., gradually decreased) for further testing, until a satisfactory combined mode is found, or until the step size has been decreased to 1.

Various search algorithms may be employed to control the complexity associated with identifying a combined mode. Example algorithms may include binary search, interpolation search, and/or the like. Early termination may be applied such that searching may be terminated when the bit cost value starts to increase. For example, if a combined mode being tested has an index run-length of 1 and the bit cost for the combined mode is already higher than the smallest bit cost derived thus far, further testing of other combined modes with smaller index mode run-length values, e.g., 1–1, 1–2, . . . , 0, may no longer be necessary and the search may be terminated.

Palette information of previously-coded coding units may be re-used. A palette sharing mode may be employed for such purpose. An indication (e.g., the syntax element palette_share_flag shown in Table 1) may be provided to signal palette sharing. The indication may be interpreted by a video coding device (e.g., the video coding system 200) as signaling that no new palette entries (e.g., no non-predicted palette colors) are being signaled for a current palette table. A predictor list may be provided to facilitate palette sharing. The predictor list may include one or more colors that may be re-used to code a current coding unit. Re-use may be signaled, e.g., via the palette_predictor_run syntax element shown in Table 1.

Table 6 shows example syntax for palette sharing. Note that the value of palette_num_signalled_entries may be derived by adding 1 to the value of the signaled syntax element palette_num_signalled_entries_minus1.

Various palette table derivation techniques may be used to derive candidate palette tables in palette sharing mode and/or to decide (e.g., from a rate-distortion perspective) which of the candidate palette tables should be chosen for a current CU. One or more of these techniques may be combined with other palette table derivation techniques. For example, the candidates produced by these techniques may be compared with candidates derived for other coding modes (e.g., coding modes other than the palette sharing mode).

In an example palette table derivation technique, a video coding device (e.g., the video coding system 100) may derive the palette table for a current coding unit based on the palette predictor list. The palette table of the last palette-coded CU may be re-used. The size of the derived palette table may be equal to the size of the last palette-coded CU. A re-use indication (e.g., a re-use flag) for palette predictor may be set for an entry on the palette predictor list. For example, a re-use indication value of 1 may indicate that the corresponding entry on the palette predictor list belongs to the palette table of the last palette coded CU and may be re-used for the current coding unit.

In an example palette table derivation technique, a usage histogram may be generated, e.g., based on the palette predictor list. For example, if the sample value of a pixel can be matched with a color entry in the palette predictor list, a counter for that color entry may be increased by 1, and/or the color entry may be regarded as a used predictor. The matching may indicate that the difference between the sample value and the palette table entry may be within a certain error limit. The specific value of the error limit may depend on one or more quantization parameters. The usage histogram may be sorted in a descending order. The palette predictors on the sorted histogram may be added to (e.g., used to form) the current palette table in the sorted order (e.g., those with larger counter values after the matching and/or counting will be added first), until the number of added predictors reaches the maximum palette table size. At that point, no more of the remaining used predictors may be added to the palette table.

TABLE 6

Example Palette Sharing Syntax

| | Descriptor |
|---|---|
| palette_coding( x0, y0, nCbS ) { | |
|   palette_share_flag[ x0 ][ y0 ] | ae(v) |
|     palettePredictionFinished = 0 | |
|     paletteNumPredictedEntries = 0 | |
|     for( i = 0; i < PredictorPaletteSize && !palettePredictionFinished && | |
|       paletteNumPredictedEntries < palette_max_size; i++ ) { | |
|       palette_predictor_run | ae(v) |
|       if( palette_predictor_run != 1 ) | |
|         if( palette_predictor_run > 1 ) | |
|           i += palette_predictor_run − 1 | |
|         PalettePredictorEntryReuseFlag[ i ] = 1 | |
|         paletteNumPredictedEntries ++ | |
|       } else | |
|         palettePredictionFinished = 1 | |
|     } | |
|   if( !palette_share_flag[ x0 ][ y0 ] ) { | |
|     if( paletteNumPredictedEntries < palette_max_size ) | |
|       palette_num_signalled_entries_minus1 | ae(v) |
|     for( cIdx = 0; cIdx < 3; cIdx++ ) | |
|       for( i = 0; i < palette_num_signalled_entries; i++ ) | |
|         palette_entry | ae(v) |
|   } | |
|   if( currentPaletteSize != 0 ) | |
|     palette_escape_val_present_flag | ae(v) |
|   if( palette_escape_val_present_flag ) { | |
|     if( cu_qp_delta_enabled_flag && !IsCuQpDeltaCoded ) { | |
|       cu_qp_delta_palette_abs | ae(v) |
|       if( cu_qp_delta_palette_abs ) | |
|         cu_qp_delta_palette_sign_flag | ae(v) |
|     } | |
|     if( cu_chroma_qp_offset_enabled_flag && !IsCuChromaQpOffsetCoded ) | |
|     { | |
|       cu_chroma_qp_palette_offset_flag | ae(v) |
|         if( cu_chroma_qp_offset_flag && chroma_qp_offset_list_len_minus1 > | |
|         0 ) | |
|           cu_chroma_qp_palette_offset_idx | ae(v) |
|     } | |
|   } | |
|   if( indexMax > 0) | |
|     palette_transpose_flag | ae(v) |
|   scanPos = 0 | |
|   while( scanPos < nCbS * nCbS ) { | |
|     xC = x0 + travScan[ scanPos ][ 0 ] | |
|     yC = y0 + travScan[ scanPos ][ 1 ] | |
|     if( scanPos > 0) { | |
|       xcPrev = x0 + travScan[ scanPos − 1 ][ 0 ] | |
|       ycPrev = y0 + travScan[ scanPos − 1 ][ 1 ] | |
|     } | |
|     if( indexMax > 0 && scanPos > = nCbS && | |
|     palette_run_type_flag[ xcPrev ][ ycPrev ] ! = COPY_ABOVE_MODE ) { | |
|       palette_run_type_flag[ xC ][ yC ] | ae(v) |
|     } | |
|     if( palette_run_type_flag[ xC ][ yC ] = = COPY_INDEX_MODE && | |
|       adjustedIndexMax > 0) | |
|       palette_index_idc | ae(v) |
|     if( indexMax > 0 ) { | |
|       maxPaletteRun = nCbS * nCbS − scanPos − 1 | |
|       if( maxPaletteRun > 0 ) { | |
|         palette_run_msb_id_plus1 | ae(v) |
|         if( palette_run_msb_id_plus1 > 1 ) | |
|           palette_run_refinement_bits | ae(v) |
|       } | |
|     } else | |
|       paletteRun = nCbS * nCbS − 1 | |
|     runPos = 0 | |
|     while ( runPos < = paletteRun ) { | |
|       xR = x0 + travScan[ scanPos ][ 0 ] | |
|       yR = y0 + travScan[ scanPos ][ 1 ] | |
|       if( palette_run_type_flag[ xC ][ yC ] = = COPY_INDEX_MODE && | |
|         paletteIndex = = indexMax ) { | |
|         PaletteSampleMode[ xR ][ yR ] = ESCAPE_MODE | |

TABLE 6-continued

Example Palette Sharing Syntax

| | Descriptor |
|---|---|
| ```
            PaletteIndexMap[ xR ][ yR ] = paletteIndex
            for( cIdx = 0; cIdx < 3; cIdx++ ) {
                palette_escape_val
                PaletteEscapeVal[ cIdx ][ xR ][ yR ] = palette_escape_val
            }
        } else if(palette_run_type_flag[ xC ][ yC ] == COPY_INDEX_MODE){
            PaletteSampleMode[ xR ][ yR ] = COPY_INDEX_MODE
            PaletteIndexMap[ xR ][ yR ] = paletteIndex
        } else {
            PaletteSampleMode[ xR ][ yR ] = COPY_ABOVE_MODE
            PaletteIndexMap[ xR ][ yR ] = PaletteIndexMap[ xR ][ yR − 1 ]
        }
        runPos++
        scanPos++
    }
  }
}
``` | ae(v) |

A video coding device (e.g., the video coding system 100) may select a palette table derivation technique from a group of potential palette table derivation techniques. The selection may be made based on rate-distortion cost. For example, the video coding device may check the non-sharing mode and derive a palette table candidate for the non-sharing mode. The video coding device may derive a palette table candidate for the palette sharing mode, e.g., using an example technique described herein (e.g., the technique utilizing usage histogram, as described herein). Based on these candidates, the video coding device may select a coding mode. If the selected coding mode is not the sharing mode and/or if the selected mode is not a palette coding mode, the video coding device may derive another candidate palette table (e.g., by using an example palette table derivation technique described herein). From all of the candidate palette tables, the video coding device may select one with the minimal rate-distortion cost. It should be noted that if the selected coding mode described herein is the sharing mode, the video coding device may skip applying the first example technique.

Figure 9A:
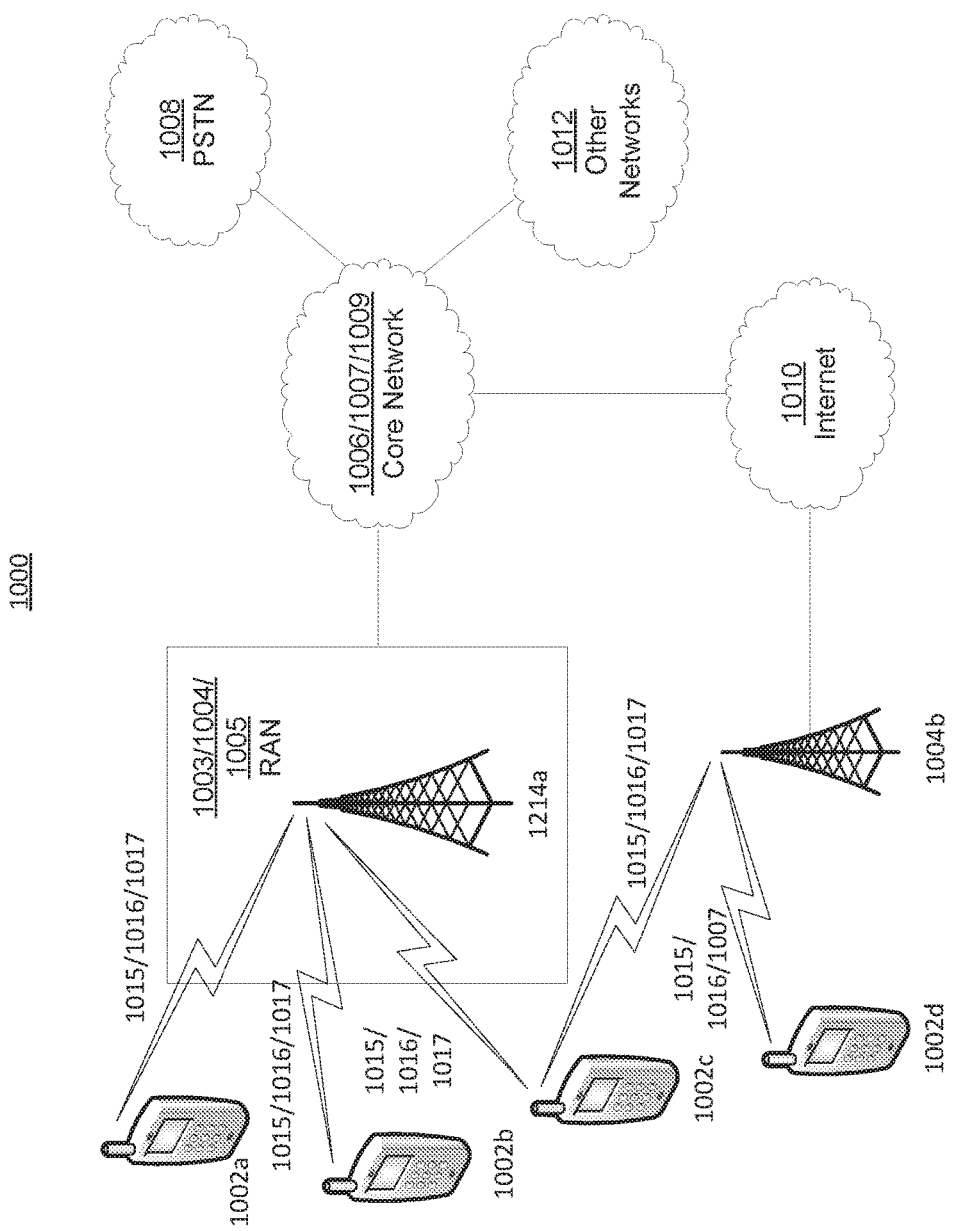
FIG. 9A depicts a diagram of an example communications system in which one or more disclosed embodiments may be implemented.

FIG. 9A is a diagram of an example communications system 1000 in which one or more examples disclosed herein may be implemented. The communications system 1000 may be a multiple access system that provides content, such as voice, data, video, messaging, broadcast, etc., to multiple wireless users. The communications system 1000 may enable multiple wireless users to access such content through the sharing of system resources, including wireless bandwidth. For example, the communications systems 1000 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 9A, the communications system 1000 may include wireless transmit/receive units (WTRUs) 1002a, 1002b, 1002c, and/or 1002d (which generally or collectively may be referred to as WTRU 1002), a radio access network (RAN) 1003/1004/1005, a core network 1006/1007/1009, a public switched telephone network (PSTN) 1008, the Internet 1010, and other networks 1012, though it will be appreciated that the disclosed embodiments contemplate any number of WTRUs, base stations, networks, and/or network elements. Each of the WTRUs 1002a, 1002b, 1002c, 1002d may be any type of device configured to operate and/or communicate in a wireless environment. By way of example, the WTRUs 1002a, 1002b, 1002c, 1002d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 1000 may also include a base station 1014a and a base station 1014b. Each of the base stations 1014a, 1014b may be any type of device configured to wirelessly interface with at least one of the WTRUs 1002a, 1002b, 1002c, 1002d to facilitate access to one or more communication networks, such as the core network 1006/1007/1009, the Internet 1010, and/or the networks 1012. By way of example, the base stations 1014a, 1014b may be a base transceiver station (BTS), a Node-B, an eNode B, a Home Node B, a Home eNode B, a site controller, an access point (AP), a wireless router, and the like. While the base stations 1014a, 1014b are each depicted as a single element, it will be appreciated that the base stations 1014a, 1014b may include any number of interconnected base stations and/or network elements.

The base station 1014a may be part of the RAN 1003/1004/1005, which may also include other base stations and/or network elements (not shown), such as a base station controller (BSC), a radio network controller (RNC), relay nodes, etc. The base station 1014a and/or the base station 1014b may be configured to transmit and/or receive wireless signals within a particular geographic region, which may be referred to as a cell (not shown). The cell may further be divided into cell sectors. For example, the cell associated with the base station 1014a may be divided into three sectors. Thus, in one embodiment, the base station 1014a may include three transceivers, i.e., one for each sector of the cell. In another embodiment, the base station 1014a may employ multiple-input multiple output (MIMO) technology and, therefore, may utilize multiple transceivers for each sector of the cell.

The base stations 1014a, 1014b may communicate with one or more of the WTRUs 1002a, 1002b, 1002c, 1002d over an air interface 1015/1016/1017, which may be any suitable wireless communication link (e.g., radio frequency (RF), microwave, infrared (IR), ultraviolet (UV), visible light, etc.). The air interface 1015/1016/1017 may be established using any suitable radio access technology (RAT).

More specifically, as noted above, the communications system 1000 may be a multiple access system and may employ one or more channel access schemes, such as CDMA, TDMA, FDMA. OFDMA, SC-FDMA, and the like. For example, the base station 1014a in the RAN 1003/1004/1005 and the WTRUs 1002a, 1002b, 1002c may implement a radio technology such as Universal Mobile Telecommunications System (UMTS) Terrestrial Radio Access (UTRA), which may establish the air interface 1015/1016/1017 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1014a and the WTRUs 1002a, 1002b. 1002c may implement a radio technology such as Evolved UMTS Terrestrial Radio Access (E-UTRA), which may establish the air interface 1015/1016/1017 using Long Term Evolution (LTE) and/or LTE-Advanced (LTE-A).

In other embodiments, the base station 1014a and the WTRUs 1002a, 1002b, 1002c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95). Interim Standard 856 (IS-856), Global System for Mobile communications (GSM), Enhanced Data rates for GSM Evolution (EDGE), GSM EDGE (GERAN), and the like.

The base station 1014b in FIG. 9A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1014b and the WTRUs 1002c, 1002d may implement a radio technology such as IEEE 802.11 to establish a wireless local area network (WLAN). In another embodiment, the base station 1014b and the WTRUs 1002c, 1002d may implement a radio technology such as IEEE 802.15 to establish a wireless personal area network (WPAN). In yet another embodiment, the base station 1014b and the WTRUs 1002c, 1002d may utilize a cellular-based RAT (e.g., WCDMA, CDMA2000, GSM, LTE, LTE-A, etc.) to establish a picocell or femtocell. As shown in FIG. 9A, the base station 1014b may have a direct connection to the Internet 1010. Thus, the base station 1014b may not be required to access the Internet 1010 via the core network 1006/1007/1009.

The RAN 1003/1004/1005 may be in communication with the core network 1006/1007/1009, which may be any type of network configured to provide voice, data, applications, and/or voice over internet protocol (VoIP) services to one or more of the WTRUs 1002a, 1002b, 1002c, 1002d. For example, the core network 1006/1007/1009 may provide call control, billing services, mobile location-based services, pre-paid calling, Internet connectivity, video distribution, etc., and/or perform high-level security functions, such as user authentication. Although not shown in FIG. 9A, it will be appreciated that the RAN 1003/1004/1005 and/or the core network 1006/1007/1009 may be in direct or indirect communication with other RANs that employ the same RAT as the RAN 1003/1004/1005 or a different RAT. For example, in addition to being connected to the RAN 1003/1004/1005, which may be utilizing an E-UTRA radio technology, the core network 1006/1007/1009 may also be in communication with another RAN (not shown) employing a GSM radio technology.

The core network 1006/1007/1009 may also serve as a gateway for the WTRUs 1002a, 1002b, 1002c, 1002d to access the PSTN 1008, the Internet 1010, and/or other networks 1012. The PSTN 1008 may include circuit-switched telephone networks that provide plain old telephone service (POTS). The Internet 1010 may include a global system of interconnected computer networks and devices that use common communication protocols, such as the transmission control protocol (TCP), user datagram protocol (UDP) and the internet protocol (IP) in the TCP/IP internet protocol suite. The networks 1012 may include wired or wireless communications networks owned and/or operated by other service providers. For example, the networks 1012 may include another core network connected to one or more RANs, which may employ the same RAT as the RAN 1003/1004/1005 or a different RAT.

Some or all of the WTRUs 1002a, 1002b, 1002c, 1002d in the communications system 1000 may include multi-mode capabilities. i.e., the WTRUs 1002a, 1002b, 1002c, 1002d may include multiple transceivers for communicating with different wireless networks over different wireless links. For example, the WTRU 1002c shown in FIG. 9A may be configured to communicate with the base station 1014a, which may employ a cellular-based radio technology, and with the base station 1014b, which may employ an IEEE 802 radio technology.

Figure 9B:
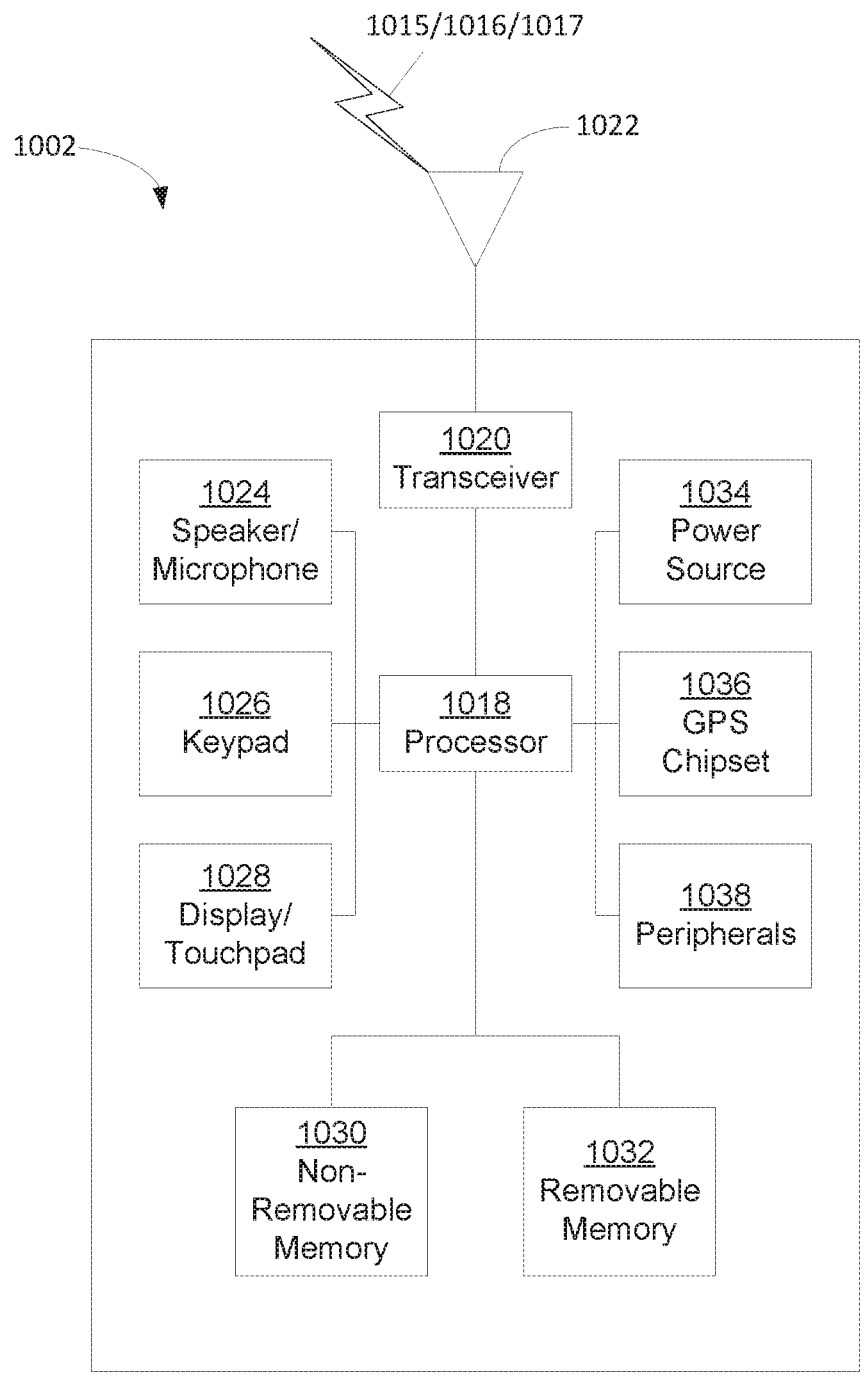
FIG. 9B depicts a system diagram of an example wireless transmit/receive unit (WTRU) that may be used within the communications system illustrated in FIG. 9A.

FIG. 9B is a system diagram of an example WTRU 1002. As shown in FIG. 9B, the WTRU 1002 may include a processor 1018, a transceiver 1020, a transmit/receive element 1022, a speaker/microphone 1024, a keypad 1026, a display/touchpad 1028, non-removable memory 1030, removable memory 1032, a power source 1034, a global positioning system (GPS) chipset 1036, and other peripherals 1038. It will be appreciated that the WTRU 1002 may include any sub-combination of the foregoing elements while remaining consistent with an embodiment. Also, embodiments contemplate that the base stations 1014a and 1014b, and/or the nodes that base stations 1014a and 1014b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 9B and described herein.

The processor 1018 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1018 may perform signal coding, data processing, power control, input/output processing, and/or any other functionality that enables the WTRU 1002 to operate in a wireless environment. The processor 1018 may be coupled to the transceiver 1020, which may be coupled to the transmit/receive element 1022. While FIG. 9B depicts the processor 1018 and the transceiver 1020 as separate components, it will be appreciated that the processor 1018 and the transceiver 1020 may be integrated together in an electronic package or chip.

The transmit/receive element 1012 may be configured to transmit signals to, or receive signals from, a base station (e.g., the base station 1014a) over the air interface 1015/

1016/1017. For example, in one embodiment, the transmit/receive element 1012 may be an antenna configured to transmit and/or receive RF signals. In another embodiment, the transmit/receive element 1022 may be an emitter/detector configured to transmit and/or receive IR, UV, or visible light signals, for example. In yet another embodiment, the transmit/receive element 1022 may be configured to transmit and receive both RF and light signals. It will be appreciated that the transmit/receive element 1022 may be configured to transmit and/or receive any combination of wireless signals.

In addition, although the transmit/receive element 1022 is depicted in FIG. 9B as a single element, the WTRU 1002 may include any number of transmit/receive elements 1022. More specifically, the WTRU 1002 may employ MIMO technology. Thus, in one embodiment, the WTRU 1002 may include two or more transmit/receive elements 1022 (e.g., multiple antennas) for transmitting and receiving wireless signals over the air interface 1015/1016/1017.

The transceiver 1020 may be configured to modulate the signals that are to be transmitted by the transmit/receive element 1022 and to demodulate the signals that are received by the transmit/receive element 1022. As noted above, the WTRU 1002 may have multi-mode capabilities. Thus, the transceiver 1020 may include multiple transceivers for enabling the WTRU 1002 to communicate via multiple RATs, such as UTRA and IEEE 802.11, for example.

The processor 1018 of the WTRU 1002 may be coupled to, and may receive user input data from, the speaker/microphone 1024, the keypad 1026, and/or the display/touchpad 1028 (e.g., a liquid crystal display (LCD) display unit or organic light-emitting diode (OLED) display unit). The processor 1018 may also output user data to the speaker/microphone 124, the keypad 1026, and/or the display/touchpad 1028. In addition, the processor 1018 may access information from, and store data in, any type of suitable memory, such as the non-removable memory 1030 and/or the removable memory 1032. The non-removable memory 1030 may include random-access memory (RAM), read-only memory (ROM), a hard disk, or any other type of memory storage device. The removable memory 1032 may include a subscriber identity unit (SIM) card, a memory stick, a secure digital (SD) memory card, and the like. In other embodiments, the processor 1018 may access information from, and store data in, memory that is not physically located on the WTRU 1002, such as on a server or a home computer (not shown).

The processor 1018 may receive power from the power source 1034, and may be configured to distribute and/or control the power to the other components in the WTRU 1002. The power source 1034 may be any suitable device for powering the WTRU 1002. For example, the power source 1034 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1018 may also be coupled to the GPS chipset 1036, which may be configured to provide location information (e.g., longitude and latitude) regarding the current location of the WTRU 1002. In addition to, or in lieu of, the information from the GPS chipset 1036, the WTRU 1002 may receive location information over the air interface 1015/1016/1017 from a base station (e.g., base stations 1014a, 1014b) and/or determine its location based on the timing of the signals being received from two or more nearby base stations. It will be appreciated that the WTRU 1002 may acquire location information by way of any suitable location-determination method while remaining consistent with an embodiment.

The processor 1018 may further be coupled to other peripherals 1038, which may include one or more software and/or hardware units that provide additional features, functionality and/or wired or wireless connectivity. For example, the peripherals 1038 may include an accelerometer, an e-compass, a satellite transceiver, a digital camera (for photographs or video), a universal serial bus (USB) port, a vibration device, a television transceiver, a hands free headset, a Bluetooth® unit, a frequency modulated (FM) radio unit, a digital music player, a media player, a video game player unit, an Internet browser, and the like.

Figure 9C:
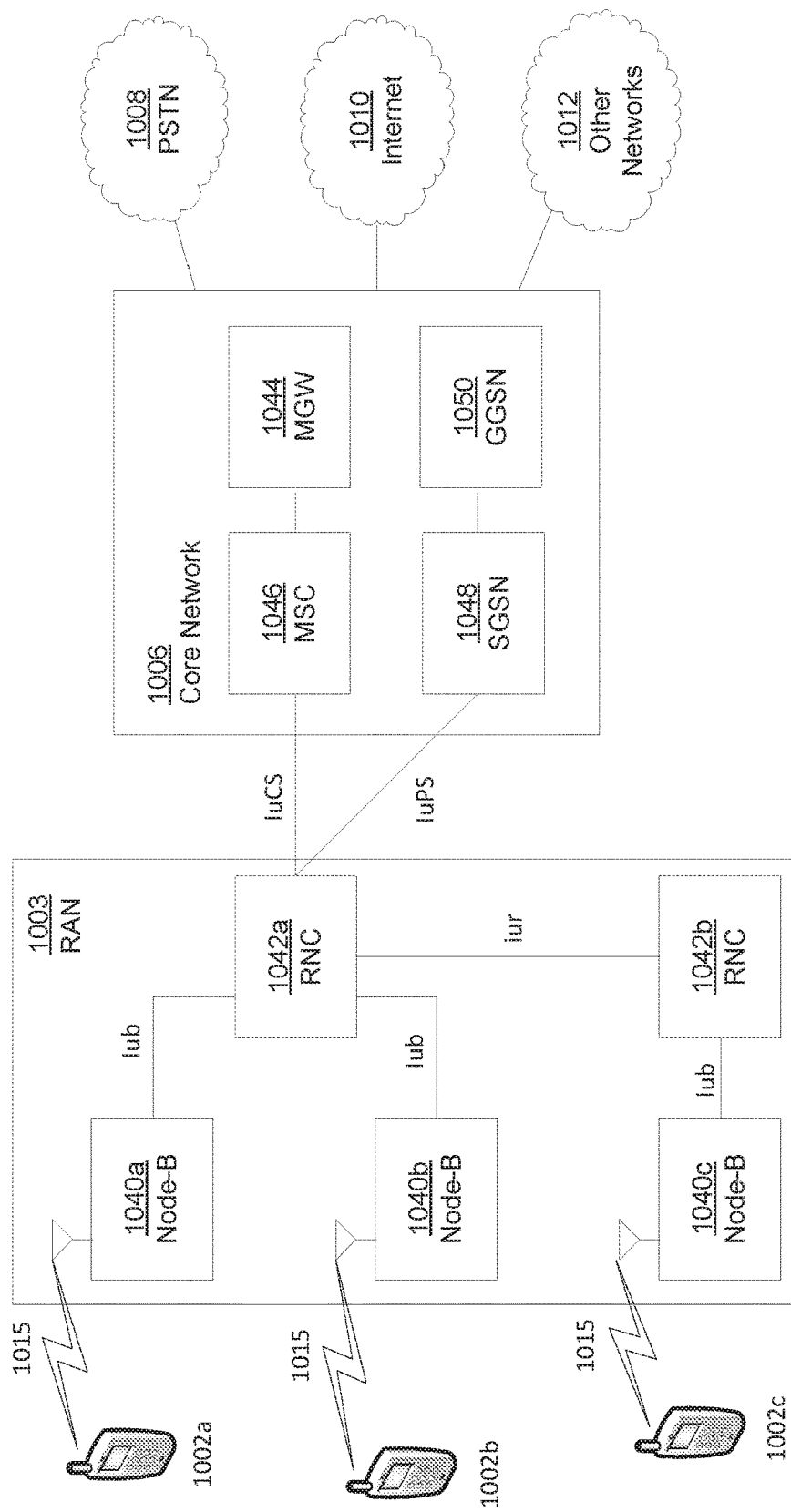
FIG. 9C depicts a system diagram of an example radio access network and an example core network that may be used within the communications system illustrated in FIG. 9A.

FIG. 9C is a system diagram of the RAN 1003 and the core network 1006 according to an embodiment. As noted above, the RAN 1003 may employ a UTRA radio technology to communicate with the WTRUs 1002a, 1002b, 1002c over the air interface 1015. The RAN 1003 may also be in communication with the core network 1006. As shown in FIG. 9C, the RAN 1003 may include Node-Bs 1040a, 1040b, 1040c, which may each include one or more transceivers for communicating with the WTRUs 1002a, 1002b, 1002c over the air interface 1015. The Node-Bs 1040a, 1040b, 1040c may each be associated with a particular cell (not shown) within the RAN 1003. The RAN 1003 may also include RNCs 1042a, 1042b. It will be appreciated that the RAN 1003 may include any number of Node-Bs and RNCs while remaining consistent with an embodiment.

As shown in FIG. 9C, the Node-Bs 1040a, 1040b may be in communication with the RNC 1042a. Additionally, the Node-B 1040c may be in communication with the RNC 1042b. The Node-Bs 1040a, 1040b, 1040c may communicate with the respective RNCs 1042a, 1042b via an Iub interface. The RNCs 1042a, 1042b may be in communication with one another via an Iur interface. Each of the RNCs 1042a, 1042b may be configured to control the respective Node-Bs 1040a, 1040b, 1040c to which it is connected. In addition, each of the RNCs 1042a. 1042b may be configured to carry out or support other functionality, such as outer loop power control, load control, admission control, packet scheduling, handover control, macrodiversity, security functions, data encryption, and the like.

The core network 1006 shown in FIG. 9C may include a media gateway (MGW) 1044, a mobile switching center (MSC) 1046, a serving GPRS support node (SGSN) 1048, and/or a gateway GPRS support node (GGSN) 1050. While each of the foregoing elements are depicted as part of the core network 1006, it will be appreciated that any one of these elements may be owned and/or operated by an entity other than the core network operator.

The RNC 1042a in the RAN 1003 may be connected to the MSC 1046 in the core network 1006 via an IuCS interface. The MSC 1046 may be connected to the MGW 1044. The MSC 1046 and the MGW 1044 may provide the WTRUs 1002a, 1002b, 1002c with access to circuit-switched networks, such as the PSTN 1008, to facilitate communications between the WTRUs 1002a, 1002b, 1002c and traditional land-line communications devices.

The RNC 1042a in the RAN 1003 may also be connected to the SGSN 1048 in the core network 1006 via an IuPS interface. The SGSN 1048 may be connected to the GGSN 1050. The SGSN 1048 and the GGSN 1050 may provide the WTRUs 1002a, 1002b, 1002c with access to packet-switched networks, such as the Internet 1010, to facilitate communications between and the WTRUs 1002a, 1002b, 1002c and IP-enabled devices.

As noted above, the core network 1006 may also be connected to the networks 1012, which may include other wired or wireless networks that are owned and/or operated by other service providers.

Figure 9D:
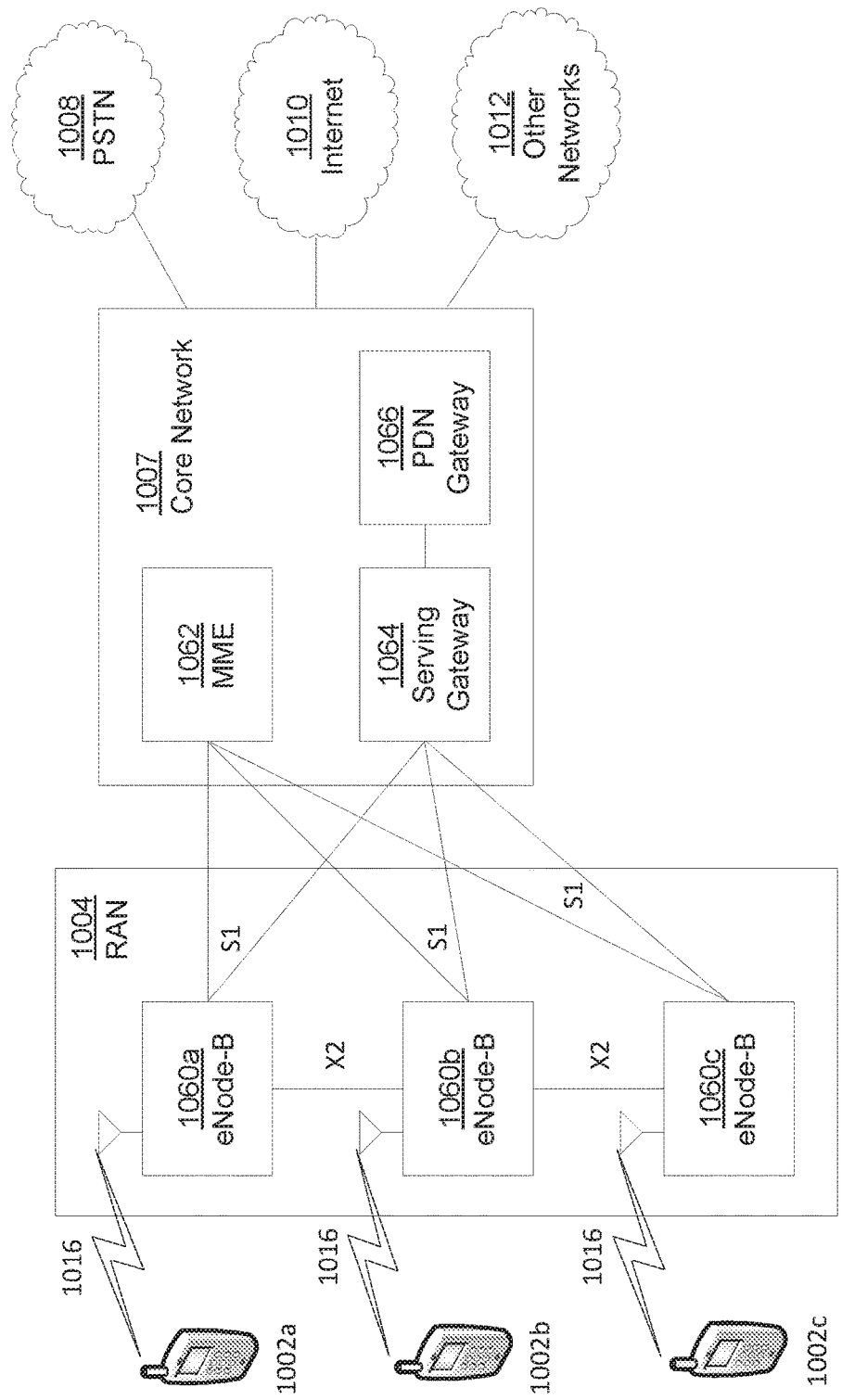
FIG. 9D depicts a system diagram of another example radio access network and an example core network that may be used within the communications system illustrated in FIG. 9A.

FIG. 9D is a system diagram of the RAN 1004 and the core network 1007 according to an embodiment. As noted above, the RAN 1004 may employ an E-UTRA radio technology to communicate with the WTRUs 1002a, 1002b, 1002c over the air interface 1016. The RAN 1004 may also be in communication with the core network 1007.

The RAN 1004 may include eNode-Bs 1060a, 1060b, 1060c, though it will be appreciated that the RAN 1004 may include any number of eNode-Bs while remaining consistent with an embodiment. The eNode-Bs 1060a, 1060b, 1060c may each include one or more transceivers for communicating with the WTRUs 1002a, 1002b, 1002c over the air interface 1016. In one embodiment, the eNode-Bs 1060a, 1060b, 1060c may implement MIMO technology. Thus, the eNode-B 1060a, for example, may use multiple antennas to transmit wireless signals to, and receive wireless signals from, the WTRU 1002a.

Each of the eNode-Bs 1060a, 1060b, 1060c may be associated with a particular cell (not shown) and may be configured to handle radio resource management decisions, handover decisions, scheduling of users in the uplink and/or downlink, and the like. As shown in FIG. 9D, the eNode-Bs 1060a, 1060b, 1060c may communicate with one another over an X2 interface.

The core network 1007 shown in FIG. 9D may include a mobility management gateway (MME) 1062, a serving gateway 1064, and a packet data network (PDN) gateway 1066. While each of the foregoing elements are depicted as part of the core network 1007, it will be appreciated that any one of these elements may be owned and/or operated by an entity other than the core network operator.

The MME 1062 may be connected to each of the eNode-Bs 1060a, 1060b, 1060c in the RAN 1004 via an S1 interface and may serve as a control node. For example, the MME 1062 may be responsible for authenticating users of the WTRUs 1002a, 1002b, 1002c, bearer activation/deactivation, selecting a particular serving gateway during an initial attach of the WTRUs 1002a, 1002b, 1002c, and the like. The MME 1062 may also provide a control plane function for switching between the RAN 1004 and other RANs (not shown) that employ other radio technologies, such as GSM or WCDMA.

The serving gateway 1064 may be connected to each of the eNode-Bs 1060a, 1060b, 1060c in the RAN 1004 via the S1 interface. The serving gateway 1064 may generally route and forward user data packets to/from the WTRUs 1002a, 1002b, 1002c. The serving gateway 1064 may also perform other functions, such as anchoring user planes during inter-eNode B handovers, triggering paging when downlink data is available for the WTRUs 1002a, 1002b, 1002c, managing and storing contexts of the WTRUs 1002a, 1002b, 1002c, and the like.

The serving gateway 1064 may also be connected to the PDN gateway 1066, which may provide the WTRUs 1002a, 1002b, 1002c with access to packet-switched networks, such as the Internet 1010, to facilitate communications between the WTRUs 1002a, 1002b, 1002c and IP-enabled devices.

The core network 1007 may facilitate communications with other networks. For example, the core network 1007 may provide the WTRUs 1002a, 1002b, 1002c with access to circuit-switched networks, such as the PSTN 1008, to facilitate communications between the WTRUs 1002a, 1002b, 1002c and traditional land-line communications devices. For example, the core network 1007 may include, or may communicate with, an IP gateway (e.g., an IP multimedia subsystem (IMS) server) that serves as an interface between the core network 1007 and the PSTN 1008. In addition, the core network 1007 may provide the WTRUs 1002a, 1002b, 1002c with access to the networks 1012, which may include other wired or wireless networks that are owned and/or operated by other service providers.

Figure 9E:
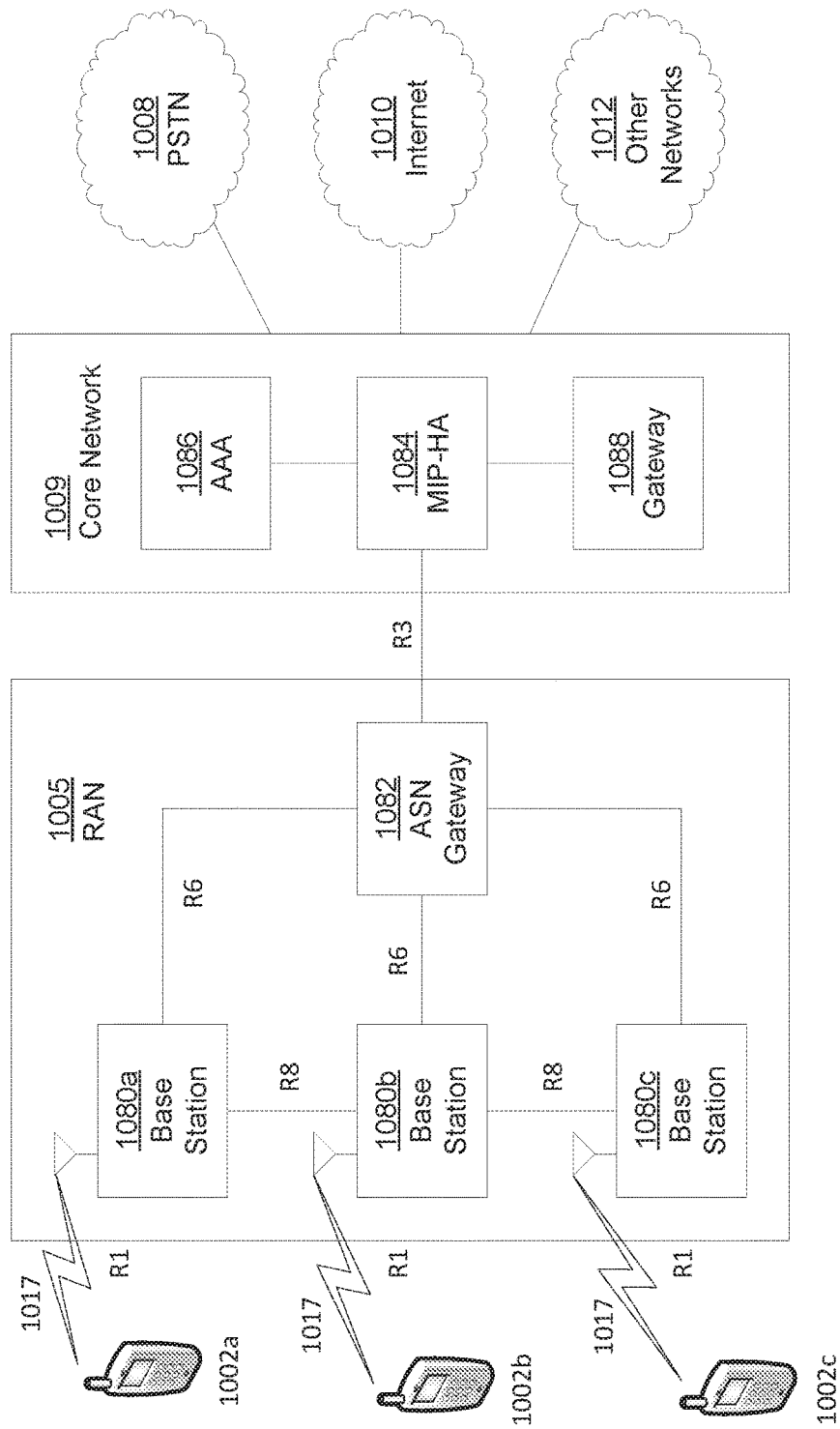
FIG. 9E depicts a system diagram of another example radio access network and an example core network that may be used within the communications system illustrated in FIG. 9A.

FIG. 9E is a system diagram of the RAN 1005 and the core network 1009 according to an embodiment. The RAN 1005 may be an access service network (ASN) that employs IEEE 802.16 radio technology to communicate with the WTRUs 1002a, 1002b, 1002c over the air interface 1017. As will be further discussed below, the communication links between the different functional entities of the WTRUs 1002a, 1002b, 1002c, the RAN 1005, and the core network 1009 may be defined as reference points.

As shown in FIG. 9E, the RAN 1005 may include base stations 1080a, 1080b, 1080c, and an ASN gateway 1082, though it will be appreciated that the RAN 1005 may include any number of base stations and ASN gateways while remaining consistent with an embodiment. The base stations 1080a, 1080b, 1080c may each be associated with a particular cell (not shown) in the RAN 1005 and may each include one or more transceivers for communicating with the WTRUs 1002a, 1002b, 1002c over the air interface 1017. In one embodiment, the base stations 1080a, 1080b, 1080c may implement MIMO technology. Thus, the base station 1080a, for example, may use multiple antennas to transmit wireless signals to, and receive wireless signals from, the WTRU 1002a. The base stations 1080a, 1080b, 1080c may also provide mobility management functions, such as handoff triggering, tunnel establishment, radio resource management, traffic classification, quality of service (QoS) policy enforcement, and the like. The ASN gateway 1082 may serve as a traffic aggregation point and may be responsible for paging, caching of subscriber profiles, routing to the core network 1009, and the like.

The air interface 1017 between the WTRUs 1002a, 1002b, 1002c and the RAN 1005 may be defined as an R1 reference point that implements the IEEE 802.16 specification. In addition, each of the WTRUs 1002a, 1002b, 1002c may establish a logical interface (not shown) with the core network 1009. The logical interface between the WTRUs 1002a, 1002b, 1002c and the core network 1009 may be defined as an R2 reference point, which may be used for authentication, authorization, IP host configuration management, and/or mobility management.

The communication link between each of the base stations 1080a, 1080b, 1080c may be defined as an R8 reference point that includes protocols for facilitating WTRU handovers and the transfer of data between base stations. The communication link between the base stations 1080a, 1080b, 1080c and the ASN gateway 1082 may be defined as an R6 reference point. The R6 reference point may include protocols for facilitating mobility management based on mobility events associated with each of the WTRUs 1002a, 1002b, 1002c.

As shown in FIG. 9E, the RAN 1005 may be connected to the core network 1009. The communication link between the RAN 1005 and the core network 1009 may defined as an R3 reference point that includes protocols for facilitating data transfer and mobility management capabilities, for example. The core network 1009 may include a mobile IP home agent (MIP-HA) 1084, an authentication, authorization, accounting (AAA) server 1086, and a gateway 1088. While each of the foregoing elements are depicted as part of the core network 1009, it will be appreciated that any one of these elements may be owned and/or operated by an entity other than the core network operator.

The MIP-HA may be responsible for IP address management, and may enable the WTRUs 1002a, 1002b, 1002c to roam between different ASNs and/or different core networks. The MIP-HA 1084 may provide the WTRUs 1002a, 1002b, 1002c with access to packet-switched networks, such as the Internet 1010, to facilitate communications between the WTRUs 1002a, 1002b, 1002c and IP-enabled devices. The AAA server 1086 may be responsible for user authentication and for supporting user services. The gateway 1088 may facilitate interworking with other networks. For example, the gateway 1088 may provide the WTRUs 1002a, 1002b, 1002c with access to circuit-switched networks, such as the PSTN 1008, to facilitate communications between the WTRUs 1002a, 1002b, 1002c and traditional land-line communications devices. In addition, the gateway 1088 may provide the WTRUs 1002a, 1002b, 1002c with access to the networks 1012, which may include other wired or wireless networks that are owned and/or operated by other service providers.

Although not shown in FIG. 9E, it will be appreciated that the RAN 1005 may be connected to other ASNs and the core network 1009 may be connected to other core networks. The communication link between the RAN 1005 the other ASNs may be defined as an R4 reference point, which may include protocols for coordinating the mobility of the WTRUs 1002a, 1002b, 1002c between the RAN 1005 and the other ASNs. The communication link between the core network 1009 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for coding a video signal using a color palette, the method comprising:
    determining a first cost associated with coding at least a first pixel of the video signal using index mode, wherein the index mode is enabled for the first pixel;
    determining a second cost associated with coding at least the first pixel using copy-above mode, wherein the copy-above mode is enabled for the first pixel;
    determining a third cost associated with coding a first run of pixels using the index mode and a second run of pixels using the copy-above mode, wherein the first run starts with the first pixel, the second run starts immediately after the first run, and the third cost is a minimum cost among a plurality of combinations of run-lengths for the first and second runs; and
    selecting a palette coding mode based on the first, second and third costs.

2. The method of claim 1, wherein the first cost is determined based on a maximum run-length of the index mode for the first pixel and the second cost is determined based on a maximum run-length of the copy-above mode for the first pixel.

3. The method of claim 2, wherein a palette coding mode associated with the smallest of the first, second, and third costs is selected.

4. The method of claim 1, wherein the first, second and third costs are calculated based on a per-pixel average number of bits used to code respective pluralities of pixels.

5. The method of claim 4, wherein the per-pixel average number of bits used is determined by dividing a total number of bits used to code the respective pluralities of pixels by respective run-lengths of the pluralities of pixels.

6. The method of claim 1, wherein determining the third cost associated with coding the first and second runs of pixels comprises:
    assigning an initial index mode run-length to the first run of pixels, the initial index mode run-length equal to a maximum index mode run-length at the first pixel;
    assigning an initial copy-above mode run-length to the second run of pixels, the initial copy-above mode run-length equal to a maximum copy-above mode run-length at the beginning of the second run of pixels;
    determining an initial cost associated with coding the first run of pixels using the index mode for the initial index mode run-length and coding the second run of pixels using the copy-above mode for the initial copy-above mode run-length;
    assigning an alternative index mode run-length to the first run of pixels, the alternative index mode run-length equal to the initial index mode run-length minus a predetermined value;
    assigning an alternative copy-above mode run-length to the second run of pixels, the alternative copy-above mode run-length equal to a maximum copy-above mode run-length at the beginning of the second run of pixels;
    determining an alternative cost associated with coding the first run of pixels using the index mode for the alternative index mode run-length and coding the second run of pixels using the copy-above mode for the alternative copy-above mode run-length; and
    selecting the smaller of the initial cost and the alternative cost as the third cost.

7. The method of claim 6, wherein the predetermined value is equal to one.

8. The method of claim 6, wherein the predetermined value is greater than one.

9. The method of claim 6, wherein the predetermined value ranges from zero to the maximum index mode run-length at the first pixel.

10. A video coding device for coding a video signal using a color palette, the video coding device comprising:
    a processor configured to:
    determine a first cost associated with coding at least a first pixel of the video signal using index mode, wherein the index mode is enabled for the first pixel;
    determine a second cost associated with coding at least the first pixel using copy-above mode, wherein the copy-above mode is enabled for the first pixel;

determine a third cost associated with coding a first run of pixels using the index mode and a second run of pixels using the copy-above mode, wherein the first run starts with the first pixel, the second run starts immediately after the first run, and the third cost is a minimum cost among a plurality of combinations of run-lengths for the first and second runs; and select a palette coding mode based on the first second and third costs.

11. The video coding device of claim 10, wherein the processor is configured to determine the first cost based on a maximum run-length of the index mode for the first pixel and the second cost based on a maximum run-length of the copy-above mode for the first pixel.

12. The video coding device of claim 10, wherein the processor is configured to select a palette coding mode associated with the smallest of the first, second, and third costs.

13. The video coding device of claim 10, wherein the first, second and third costs are calculated based on a per-pixel average number of bits used to code respective pluralities of pixels.

14. The video coding device of claim 13, wherein the per-pixel average number of bits used is determined by dividing a total number of bits used to code the respective pluralities of pixels by respective run-lengths of the pluralities of pixels.

15. The video coding device of claim 10, wherein the processor is configured to determine the third cost associated with coding the first and second runs of pixels by:
assigning an initial index mode run-length to the first run of pixels, the initial index mode run-length equal to a maximum index mode run-length at the first pixel;
assigning an initial copy-above mode run-length to the second run of pixels, the initial copy-above mode run-length equal to a maximum copy-above mode run-length at the beginning of the second run of pixels;
determining an initial cost associated with coding the first run of pixels using the index mode for the initial index mode run-length and coding the second run of pixels using the copy-above mode for the maximum copy-above mode run-length;
assigning an alternative index mode run-length to the first run of pixels, the alternative index mode run-length equal to the initial index mode run-length minus a predetermined value;
assigning an alternative copy-above mode run-length to the second run of pixels, the alternative copy-above mode run-length equal to a maximum copy-above mode run-length at the beginning of the second run of pixels;
determining an alternative cost associated with coding the first run of pixels using the index mode for the alternative index mode run-length and coding the second run of pixels using the copy-above mode for the alternative copy-above mode run-length; and selecting the smaller of the initial cost and the alternative cost as the third cost.

16. The video coding device of claim 15, wherein the predetermined value is equal to one.

17. The video coding device of claim 15, wherein the predetermined value is greater than one.

18. The video coding device of claim 15, wherein the predetermined value ranges from zero to the maximum index mode run-length at the first pixel.

19. A method for coding a plurality of pixels using a color palette, the method comprising:
determining a first combination mode coding cost associated with coding a first run of pixels in an index mode and a second run of pixels in a copy-above mode, the first run of pixels starting with a first pixel and having a first index mode run-length, the second run of pixels starting at a second pixel that is immediately after the first run of pixels, the second run of pixels having a run-length equal to a maximum copy-above mode run-length associated with the second pixel;
determining a second combination mode coding cost associated with coding a first alternative run of pixels in the index mode and a second alternative run of pixels in the copy-above mode, the first alternative run of pixels starting with the first pixel and having an alternative index mode run-length that is different than the first index mode run-length, the second alternative run of pixels starting at a third pixel that is immediately after the first alternative run of pixels, the second alternative run of pixels having a run-length equal to a maximum copy-above mode run-length at the third pixel; and
selecting a palette coding mode based on the first combination mode coding cost, the second combination mode coding cost, and a threshold coding cost, wherein:
on a condition that the first combination mode coding cost is smaller than the second combination mode coding cost and the threshold coding cost, the palette coding mode is selected so that the first run of pixels is coded in the index mode for the first index mode run-length and the second run of pixels is coded in the copy-above mode for the maximum copy-above mode run-length associated with the second pixel; and
on a condition that the second combination mode coding cost is smaller than the first combination mode coding cost and the threshold coding cost, the palette coding mode is selected so that the first alternative run of pixels is coded in the index mode for the first alternative index mode run-length and the second run of pixels is coded in the copy-above mode for the maximum copy-above mode run-length at the third pixel.

* * * * *